(12) United States Patent
Wang

(10) Patent No.: US 11,632,341 B2
(45) Date of Patent: Apr. 18, 2023

(54) ENABLING COMMUNICATION WITH UNIQUELY IDENTIFIABLE OBJECTS

(71) Applicant: Polypie Inc., Atascadero, CA (US)

(72) Inventor: Jenny Z. Wang, Atascadero, CA (US)

( * ) Notice: Subject to any disclaimer, the term of this patent is extended or adjusted under 35 U.S.C. 154(b) by 0 days.

(21) Appl. No.: 17/200,901

(22) Filed: Mar. 14, 2021

(65) Prior Publication Data

US 2021/0288927 A1 Sep. 16, 2021

Related U.S. Application Data

(60) Provisional application No. 62/989,589, filed on Mar. 14, 2020.

(51) Int. Cl.
| | |
|---|---|
| *G06K 7/14* | (2006.01) |
| *H04L 51/02* | (2022.01) |
| *G06F 3/048* | (2013.01) |

(52) U.S. Cl.
CPC .............. *H04L 51/02* (2013.01); *G06F 3/048* (2013.01); *G06K 7/1417* (2013.01)

(58) Field of Classification Search
CPC ......... H04L 51/02; H04L 51/16; H04L 67/02; H04L 67/327; G06N 5/041; G06N 3/08; G06N 3/0454; G06N 20/00; G06N 3/0445; G06N 20/10; G06N 7/005; G06N 3/04; G06Q 10/107; G06Q 10/10; G06K 7/1417

See application file for complete search history.

(56) References Cited

U.S. PATENT DOCUMENTS

| | | |
|---|---|---|
| 9,042,540 B2 | 5/2015 | Tuchman et al. |
| 2009/0245500 A1* | 10/2009 | Wampler .............. H04M 7/006 379/265.09 |
| 2013/0134213 A1 | 5/2013 | Pallakoff et al. |
| 2015/0099257 A1 | 4/2015 | Kozloski et al. |

(Continued)

FOREIGN PATENT DOCUMENTS

| | | |
|---|---|---|
| EP | 2787468 B1 | 4/2016 |
| JP | 2020505673 A | 2/2020 |
| WO | 2020/098188 A1 | 5/2020 |

OTHER PUBLICATIONS

International Search Report and Written Opinion, Application No. PCT/IB2022/052252, dated Jun. 16, 2022.

*Primary Examiner* — Jonathan A Bui
*Assistant Examiner* — Kidest Mendaye

(57) ABSTRACT

An approach is disclosed that provides personalized two-way communication with a uniquely identified object and an AI agent. Information about the object in a context associated with a requestor is received to access to an object knowledge base. The information is analyzed to determine a unique reference for the object. A selected set of the received information and the object categorization may be sent to an object knowledge base populated with AI configuration parameters tied to uniquely identified objects. The object knowledge base is searched for the unique reference to determine a registration assessment. The registration assessment is one of registered and not registered. When the registration assessment is determined to be not registered, the object is added to the object knowledge base. After receiving an AI connection from the object knowledge base, the context associated with the requestor is sent to the AI connection.

18 Claims, 28 Drawing Sheets

(56) References Cited

U.S. PATENT DOCUMENTS

| | | | |
|---|---|---|---|
| 2016/0077711 A1* | 3/2016 | Jung | G06Q 30/02 |
| | | | 715/765 |
| 2016/0093106 A1 | 3/2016 | Black | |
| 2017/0109949 A1* | 4/2017 | Blumer | G06Q 40/08 |
| 2017/0148084 A1 | 5/2017 | Axelsson et al. | |
| 2018/0124245 A1* | 5/2018 | Klein | H04L 67/02 |
| 2018/0321931 A1 | 11/2018 | El Maghraoui et al. | |
| 2018/0349976 A1* | 12/2018 | Viswanathan | G06K 7/1417 |
| 2019/0042988 A1 | 2/2019 | Brown et al. | |
| 2020/0137230 A1 | 4/2020 | Spohrer et al. | |
| 2021/0117948 A1 | 4/2021 | Voss | |

\* cited by examiner

FIG. 10C (Continued)

health center. How can I help?

your customers to select (Minimum 3 options, up to 5 options).

| | Ranks | Responses |
|---|---|---|
| | 1 | You are welcome to stop by during |
| would like to make ar | 2 | Sorry to hear that! Please use cal |
| | 3 | The 2019-20 flu vaccine will be |

FIG. 10D (Continued)

Created Date       Updated Date 03-07-2020 5:09 PM       03-10-2020 7:46 PM

FIG. 10F (Continued)

ENABLING COMMUNICATION WITH UNIQUELY IDENTIFIABLE OBJECTS

BACKGROUND

The present invention relates to a computing environment, and more particularly to an approach for enabling communications with uniquely identifiable objects.

SUMMARY

According to one embodiment of the invention, there is a method for providing two-way communication with a uniquely identified object. Information about the object is received for registration in an object knowledge base from a requestor. The information is analyzed to determine a unique identification for the object. The object knowledge base is searched for the unique identification to determine a unique reference used for a registration assessment. The registration assessment is one of registered and not registered. When the registration assessment is determined to be not registered, the object is added to the object knowledge base. AI configuration selections are received from the requestor to support the two-way communication with the object and the AI configuration selections associated with the object are added in the object knowledge base.

According to one embodiment of the invention, there is a method for associating information about an object with a reference to the object in an object knowledge base. Information about the object is received. An object recognition algorithm is applied to the information to categorize the object. Additional information is requested and received iteratively about the object to determine a uniqueness qualification assessment where the uniqueness qualification assessment is one of uniquely identifiable and not uniquely identifiable. When the uniqueness qualification assessment is determined to be uniquely identifiable, the uniqueness qualification assessment is mapped to a unique reference for the object in the object knowledge base.

According to one embodiment of the invention, there is a method for receiving personalized two-way communication with a uniquely identified object and an AI agent. Information related to the object in a context associated with a requestor is received. An object recognition algorithm is applied to the information related to the object to categorize the object. A selected set of the received information and the object categorization is sent to an object knowledge base populated with AI configuration parameters tied to uniquely identified object. After receiving an AI connection from the object knowledge base, the context associated with the requestor is sent to the AI connection.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
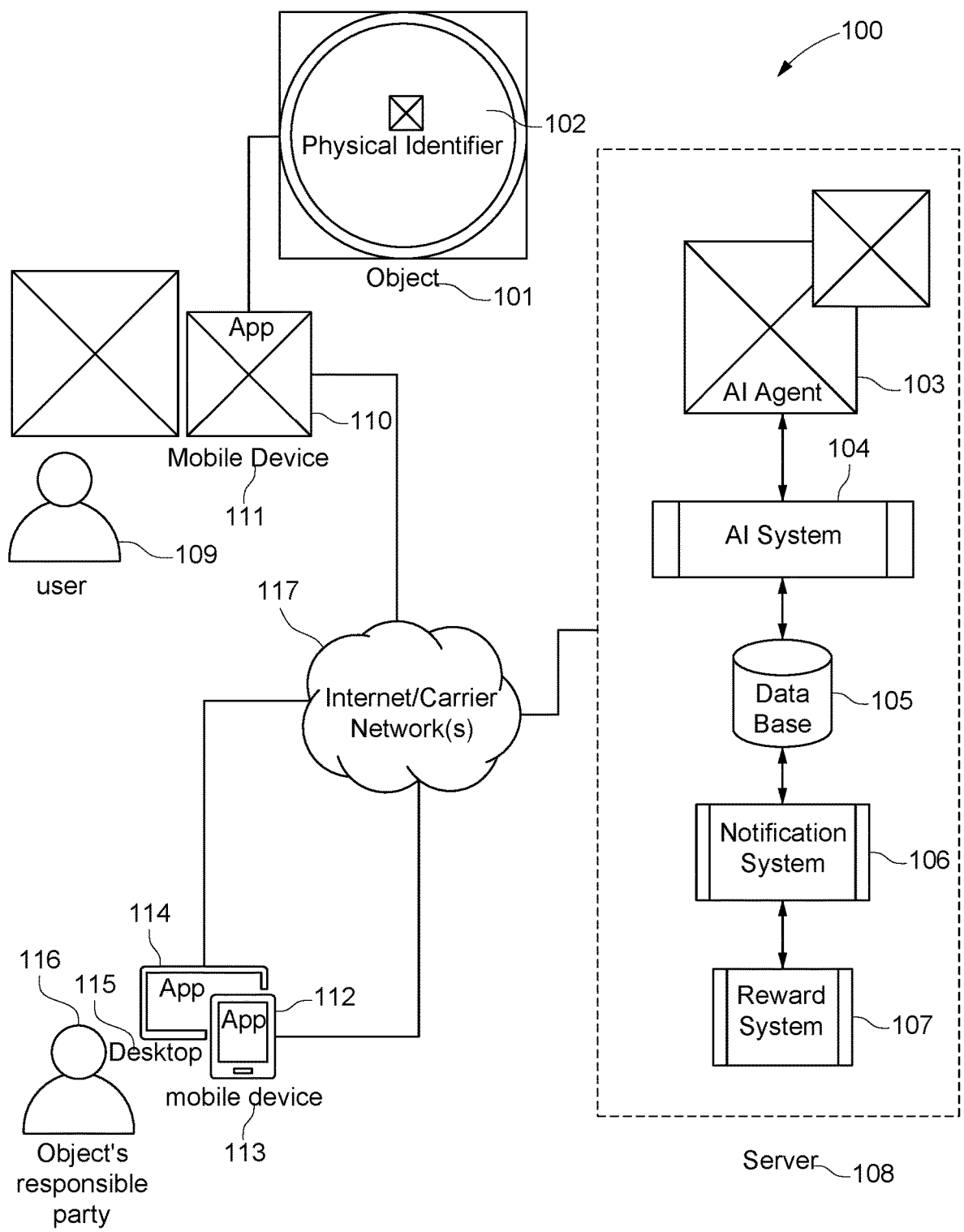
FIG. 1 is a block diagram illustrating a high-level view of an intelligent communication system in a first embodiment of the present invention.

FIGS. 1-11 describe embodiments of this invention to enable two-way communication with physical objects.

The current invention relates to two-way communication with an AI agent associated with a uniquely identifiable object having a distinct existence which may be referenced as a digital replica of the uniquely identifiable object. In an embodiment, the objects may be restricted to material things that can be seen and touched, such as products, machines, or animals with the aid of Artificial Intelligence (AI) or Machine Learning (ML) technology and mobile devices. It has a wide range of applications, including but not limited to assisting users for reporting an issue, requesting maintenance, conducting a user-experience survey, collecting user feedback, scheduling, and planning, placing orders, troubleshooting, learning and training, and making reservations.

Communication is the intentional exchange of information. People always have the desire and need to communicate with objects (e.g., facilities, products, animals) to obtain information, request help, inform others, and share attitudes toward using the objects. For instance, when a customer buys a new product, they always want to quickly learn how to use it; when a user sees a toilet that is out of order in a public restroom, they would like to notify the facility management and get it repaired; when people shop at a grocery store and cannot find the product they want, they would feel the need to let the store manager know and suggest that product.

Traditionally, obtaining information or requesting help through communications is accomplished by phone calls, a live human agent, emails, online support such as chats and instant messaging, and the like. However, these approaches are not only time-consuming but also may include outdated or irrelevant information. For example, when a user calls facility management to report an issue, they must find the phone number, dial it, and maybe waiting for assistance or be transferred to other numbers. When the user is connected to a customer service agent, they must describe an issue in detail, such as the name, the geographical location, the date and time, the urgency, etc. If a prior user has reported an issue, the current user cannot learn about the status until the user contacts customer service. As a result, the user experience using traditional approaches is often poor due to the low communication efficiency.

With the advent and prolific use of smart devices, many businesses have tried to provide self-service means to automate customer service. For instance, one of the solutions is using a computing device. Products can have embedded computer chips that could store information on the storage devices, capture user's query by voice recognition chips, process user's input by Central Processing Unit (CPU) chips, and present the responses to the user by voice or/and video as output units. Another example is a self-service kiosk. A user typically inputs their requests through a touch screen, navigating the menu to find the product or service in which they are interested in. The corresponding responses stored in the kiosk memory chip will be displayed on the screen to the user, sometimes accompanied by audio or video. Nevertheless, the cost of installation, maintenance, and energy consumptions for computing device embedded products or machines is high.

Another way to automate communications is using the Internet of Things (IoT). Chips with multiple functions such as System on Chip (SoC), communication, computation, and storage can be integrated and manufactured on a single silicon die, which requires less footprint and power consumption. In most IoT applications, every object is connected to the Internet. The objects may include coffee makers, lamps, washing machines, wearable devices, etc. Communication between the user and the object is enabled by the computer chips and network. An example is a patient with an implanted IoT to monitor the heart rate. This device collects information automatically and alerts doctors when the patient's heart rate is abnormal. Although there are several benefits in using IoT for automation, digitally connected things have well-understood security and privacy risks.

In addition, not every object can be automated to communicate with users economically and efficiently. For instance, for low-cost consumer products, such as a faucet, installing such a system is not justified by the return on investment. Moreover, in these applications, there is no user-object communication; the user inputs the instructions of these devices and passively receives data through the network. On the other hand, there are many existing legacy objects, such as infrastructures that were built decades ago. Retrofitting these facilities and objects with communication capabilities often incur enormous investments.

With the advent of mobile devices, such as smartphones and tablets, mobile computing and communications became ubiquitous. These devices are often equipped with cameras, near field communication (NFC) chips, radio frequency identification (RFID), Bluetooth, modem, Wi-Fi, touch-screen displays, audio components, and the like. If equipped with appropriate applications, they can be used as tools for communication. For example, a user can get instant assistance from a remote customer service representative or virtual assistance through a mobile application. When a user interacts with a virtual assistant (also called "Chatbot" or conversational AI, or AI agents), it can process natural language voice commands and complete predefined tasks for the users. The virtual assistance technology helps improve the interaction and communication between business and customers and save human agents time on tedious or repetitive tasks.

Usually, an AI agent possesses the following capabilities: natural language processing (NLP) or natural language understanding (NLU) to enable successful communication with humans; knowledge representation to store what it recognizes; automated reasoning using the stored information to answer questions and to draw new conclusions; machine learning for detecting and extrapolating patterns; computer vision to perceive objects; and robotics to manipulate objects and move around. All the capabilities mentioned above allow an AI agent to operate autonomously, perceive their environment, persist over a prolonged period, adapt to change, and create and pursue goals. AI agents need knowledge about the world and update the knowledge base frequently to solve problems and reach good decisions. The knowledge contained in AI agents is in the form of sentences. Each sentence is expressed in a language called a knowledge representation language. An agent that wants to acquire knowledge from humans, needs to understand ambiguous languages that humans use. One way to reduce ambiguity in the communication is to keep the conversation flow with clear context with deterministic situations and topics. If designed and implemented successfully, AI can be critical for solving various problems in day-to-day life.

Retail, healthcare, e-commerce, public service, and other businesses still have problems finding and training the right employees on the front lines dealing with customers. Advanced technologies, including AI are reaching to businesses to offer them abilities to provide more customer support. Automating customer service through kiosks or online live chat with AI and human agents can increase the effectiveness and efficiency of customer engagement. However, the communication between the users and the machines usually lacks context and requires extra time and effort to gather relevant information to facilitate the communication.

Digital replicas also may provide some historical data and track history of the objects they represent, but do not provide a personalized communication interface.

This disclosure addresses the needs mentioned above and the deficiencies of the prior art and conventional communication methods by providing an intuitive, intelligent, and customizable communication system comprising: a physical identifier, e.g., a Quick Response (QR) code, a Near Field Communication (NFC) chip, or a vision system that uniquely identifies a particular object by "looking" at it, an AI agent (also referred to as a "conversational AI agent), an AI system, a database, a notification system, and a reward system. The AI agent determines what should be presented to the user as well as whether notification needs to be sent. Low cost and lightweight embodiments of the invention have been implemented. There is no need to install any electronic, computing, or network devices on the object for communication. All the heavy computing and logic processing may be on a remote server rather than locally near the object. While in robots, the Internet of Things (IoT), or some intelligent machines, computing devices, and communication programs are required to be installed on each object, which increases the cost of the system.

Various embodiments of the invention provide a more efficient and accurate system for a requestor to communicate with an object. A requestor is someone who asks for something and may be referred to as a user, an end-user or a customer. An example of a requestor is an entity who can access the disclosed system by sending a request to communicate with an AI agent associated with a uniquely identified object. For example, the entity can be, but not limited, to a variety of end-users including a mobile user, a robot, an individual, etc. In some embodiments, a requestor is a variety of clients such as a subject matter expert or an object's responsible party (e.g., a manufacturer, a distributor, a retailer, an online seller, a service provider, a customer service associate, etc.)

The "object" in this disclosure refers to any unique identifiable physical object. A uniquely identifiable object is an object that can be distinguished from all other objects with at least one marked or unmarked indication, even those with substantially similar manufacturing specifications. For example, a product has a UPC (universal product code) which specifies a species of the product. However, at least one additional feature or attribute of the product can be used to distinguish them even within a batch of manufactured products sharing the same UPC. The feature or attribute of the product can be but not limited to a serial number of a product, a service location of the product, and installation timestamp, etc. That product is considered uniquely identifiable. One problem with communicating with an agent about an identifiable but not uniquely identified object is that the subject or topic in a conversation may be too general to lead to efficient and effective communication. The requestor has to provide additional information to describe the uniqueness of the identifiable object such as the owner of the object, the purchase date of the object, the service location of the object, etc. for the other party to understand the context accurately in the communication. For example, a requestor wants to submit a maintenance request for a broken light bulb in a room. If the requester sends a query with "a light bulb" in the textual or audio form to the system, a system can search and analyze the object based on the first requestor's input such as "a light bulb" in the textual or audio form. As a result, a search engine on the system performs a general search at a keyword level of specificity. Sometimes a general search engine passes search query values to a vertical search engine via APIs such as Google cloud vision API for a specified niche search. An image of an object can be used in the search query. However, the search engine only returns an identified object as a result.

A stationary object may be, for example, a stop sign, a street tree, a solar panels roof, a house, a fixture in a building, and the like. In an embodiment, a stationary object is referred to as equipment or device located in a permanent location with a determined Global Positioning System (GPS) location that will not be changed over time. In contrast, a non-stationary or mobile object may include a vehicle, an animal, a mobile device, a pair of shoes, a container, an accessory, etc.

In one embodiment, information is captured about the object which may include an indicator of the physical object such as a physical object identifier or a machine-readable medium (e.g., QR code label, NFC chip). In some embodiments, the physical object identifier may be required to be attached to uniquely identify an object. The machine-readable medium may be configured, edited, duplicated, and modified without changing the object. The user may initiate the communication using a mobile application. One or more decoding algorithms may be used to extract the information encrypted on the machine-readable medium. The result of decoding is sent to the server and translated to executable instructions. Once the connection is established, a conversational UI is presented on the user's mobile device (e.g., a smartphone, tablet, laptop, smart headset, etc.) through a mobile application. When an AI agent residing on the server is available, it can instantly respond to the user.

Another embodiment utilizes a computer vision system with advanced object recognition algorithms to identify an object. The computer vision system is logically running on a user's mobile device equipped with a camera. When a user activates the camera feature on the mobile device and takes pictures of the object, the captured images are indications of the object and may be sent to the server to be processed. This disclosure describes examples of systems and methods that allow for intelligently searching, analyzing, and providing one or more indications of a uniquely identifiable object. An indication can be a sign or piece of information that indicates something. In some embodiments, the indication(s) may include one or more pieces of information about the object for registration in an object knowledge base from a requestor and a system can utilize the indication(s) to perform a direct or indirect search for the physical object in the object database. For example, an indication may include one or more combinations of a GPS location of a stationary object, a reference point of the AI agent's service location, or a name of an object's responsible party, or metadata about an object (e.g., a UPC or a QR code as a visible mark attached to an object, registration date and time for the object in the object knowledge base, etc.). The object knowledge base is searched for the unique reference to determine a registration assessment. The registration assessment is one of registered and not registered. When the registration assessment is determined to be not registered, the object is added to the object knowledge base. AI configuration selections are received from the requestor to support the two-way communication with the object and the AI configuration selections associated with the object are added in the object knowledge base. An AI agent associated with an identified object may have a predefined conversation goal or a specific task to interact with users. The AI agent intends to help users by delivering the most relevant information. For example, the AI agent can help a user troubleshoot an issue related to the identified object without having the user call a customer service agent. The AI agent can assist the user to report an issue related to the identified object and notify the object's responsible party. The AI agent can provide other support such as, but not limited to, helping the user to file a claim for a product, placing an order for a product, collecting user experience for a particular product, and requesting maintenance service for a product, to name a few. As a result, an AI agent can provide live support services in a similar way that a human can deliver to a user. When an AI agent residing on the server is available, it can instantly respond to the user.

The object detection and identification modules in the computer vision system may process image data and search the matched object record in the object knowledge base. If the object is identified and the AI agent associated with the object is activated, an AI agent will instantly communicate with the user. Once the system identifies an object, the user can instantly obtain the object's information, troubleshoot the object, report an issue of the object, or send feedback about user experience to the object's responsible party (also is referred to as a client) by interacting with a context-aware conversational AI agent through a conversation. Each AI agent is uniquely associated with a uniquely identifiable object. When an AI agent is configured, the conversational goals related to an identified object may be predefined for the agent. For example, assisting a user in reporting an issue for a delivery package, helping business conduct a user experience survey on a specific product, helping homeowners request maintenance service for the solar panel roofs at their residence, and the like. When a user interacts with an identified object, the associated AI agent retrieves and uses the relevant information related to the object from the object knowledge base (KB). A set of dialog and business rules are predefined to allow the AI agent to transmit the relevant information. For example, in response to a user's query, the AI agent may analyze the user's role, scenario, and interactions in real-time. The synthesized optimal response is dynamically presented on the user's mobile device. The object KB is updated in real-time by the AI agent using scenario analysis with data from all users' conversation history. The approach disclosed herein provides a more comprehensive and tailored interaction compared to the prior art, which limits the responses to the user's inquiries to information from a general KB with very limited predefined questions and answers. The responses to the user may not be context specified. Sometimes a user has to navigate through the KB to find the related information; the search results could be useless since the answers may not be specific to the object.

According to several embodiments, the conversations are analyzed by an AI system using Natural Language Processing (NLP), Machine Learning (ML), a rule engine, and an analytics module. Therefore, the efficiency and accuracy of communication are improved. In contrast, in the conventional customer service system, such as phone support, online form, and online live chat customer service, communication is usually conducted through a computer network, not directly through an identified object. Generally, the customer service agents do not know the context until receiving a user's responses. Every user must specifically provide detailed information identifying the object or issues when they submit an inquiry. Embodiments of this disclosure enable a plurality of uniquely identified objects to be "conversational" with users and have context-based communication.

Additionally, the system may implement a user-role-based user interface (UI). That is, the UI is different depending upon the role of the user (the user can be an "object's responsible party" or an "end-user). The user's role can be defined when a user registers an account with the system. When an AI agent verifies the user's role, the AI agent's responses in a conversation are dynamically adapted based on the user's role and scenario. Users with different roles can have different conversations even though they interact with the same object. In addition, the system provides an agent management system comprising tools to customize AI agents with various features, such as persona, dialog rules, interface, AI agent state modules to activate or deactivate AI agent, and other functionality (or features) modules to meet one or more business requirements such as the location of service, languages (e.g., English, Spanish, Japanese, etc.), tones used in the conversation, duration of the conversation, and priority, etc. Either a system administrator or an object's responsible party who manages or owns the identified object can use the AI agent management system to configure one or more AI agents. On the contrary, the conventional chatbots respond to the users with static and predictable UI and dialog flow.

AI agents can determine whether a notification needs to be generated, what needs to say, and to whom it needs to be sent. The notification system is configured to transmit data by communicating with an AI system and application programming interfaces (APIs). As used herein, the term API refers to a set of specifications, such as Hypertext Transfer Protocol (HTTP) request messages, along with a definition of the structure of response messages, usually in Extensible Markup Language (XML) or JavaScript Object Notation (JSON) format. The API calls a function using at least one parameter, the notification system for the response generates at least one message returned from the function called. The messages may be sent to multiple users, including the object's responsible party, who may be an individual or an organization with one or more members. The notifications may be categorized automatically and sent to the corresponding members who are subject matter experts to resolve the issues.

A reward system is configured to communicate with a mobile application or a web application to provide reward information to users who use the system to communicate with a plurality of objects, including uniquely identified objects and associated AI agents. The reward system includes a reward earning program management module, a reward policies module, a database access module, an APIs access module, and a database storing the rewards information.

The reward program management module provides access and information management functions for the users. A rewards program is usually implemented by a client to maintain a client base, incentivize customer purchases, encourage customer engagement, loyalty, sales of its products and/or services, sharing feedback, contributing important information, etc., through the disclosed system. A client can also define its own reward policy or rules in the process of creating a new AI agent associated with a uniquely identifiable object or update the reward program or policy anytime. The client can award customers based on certain criteria. A variety of rewards (e.g., cash, digital points, digital currency, coupons) and criteria can be configured and updated by the clients. For example, a customer may earn one digital coin equal to $1 in rewards for spending $100 with the business through the disclosed system. The customer must be a registered user to earn rewards. They can earn rewards, redeem rewards, or transfer rewards to other accounts through the end-user mobile application. A set of criteria can be predefined by the client include earning rewards for reporting facility issues at least one time a month, uploading at least one image file of a unique object images file which has not been stored in the object knowledgebase, purchases made on a certain date or time, or interacting with at least five different AI agents, or purchases of specific products and/or brands with AI agents. In some embodiments, the system awards AI agents with points to complete a successful conversation with a user. For example, if a user initiates a conversation with an AI agent and they do not abort the conversation section; in that case, the AI agent will receive a point for completing a service. The points earned by the AI agents can be used toward evaluating the performance of the AI agent and user experience with the AI agents and the system.

A rewards history file stored in the database may include multiple identifications associated with a variety of users who use the system (e.g., a registered mobile user who earns rewards, a registered manufacturer who implements a reward program and policy, an AI agent). In addition, the reward history data file may store other information such as rewards earned by the users, the identification associated with each reward, reward transactions (e.g., the timestamps of earned or redeemed or transferred rewards), identification of reward policy mapping to the associated rewards earned or redeemed by the users. The rewards feature can motivate users to utilize the system and applications to communicate with the AI agents with information that could benefit the object's responsible party and the object KB.

According to several embodiments, the invention protects a user's privacy data. If a user does not want to disclose personal information (privacy data) such as name, location, email, or phone number, the communication between the user and an AI agent through the object can be completely anonymous. The user can use a generic machine-readable decoder mobile application to interact with a physical identifier on the object to anonymously have a conversation with an AI agent. In this case, the system will recognize the user as a non-registered user. Therefore, the AI agent will not ask for any personal information in the conversation.

Various embodiments and aspects of the inventions such as system design, use cases, and generic process flow will be described with reference to details discussed in this section. The accompanying drawings will illustrate the various embodiments. The following descriptions and drawings illustrate the invention and are not to be constructed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a specific feature, structure, or characteristic described in conjunction with the embodiment can be included in at least one embodiment of the invention. These embodiments are examples that help to understand the invention. The appearances of the phrase "in one embodiment" in various places in the specification do not necessarily refer to the same embodiment.

FIG. 1 is a block diagram illustrating a high-level view of an intelligent communication system in a first embodiment of the present invention. As shown in FIG. 1, the system 100 comprises a physical identifier 102, an AI agent 103, an AI system 104, a database 105, a notification system 106, and a reward system 107 running on a server 108. A user 109 uses a mobile application 110 installed on a mobile device 111 to interact with the physical identifier 102 attached to the object 101. An object's responsible party 116 may receive a notification from a mobile application 112 running on a mobile device 113 or a web application 114 running cna desktop machine 115. The AI agent 103 determines how to respond, what to say, whether a notification needs to be sent, as well as who will receive a notification. The object 101 is identified using database 105, based on the unique identifier 102, without requiring the user to provide detailed information to identify the object 101 in communication. A physical object 101 in the system has a unique object identification 102 associated with a unique AI agent identification. The object data file may include information such as the object's properties and the object's knowledge base. Object properties are defined as an association between name and value. The paired name and value of an object's attribute are linked with an object's property. Properties may refer to the collection of measurable values that are associated with a specific object. For example, the properties of a specific object include an object's unique identification number and/or one or more descriptive, or measurable information such as the dimensions of the object, the weight of the object, the color of the object, images of the object, manufacturer's serial number (MSN), current geographical location of the object, and the owner information of the object, etc. The AI agent 103 can access the information of the object's properties in the object KB 303.

A physical identifier 102, including a machine-readable medium such as a QR code label or an NFC chip, is attached to a unique identified object 101. A series of computer-executable instructions are encoded and stored in the form of machine-readable code. The data may be various formats such as alphanumeric or characters, symbols, or combinations. In the process of generating or decoding the code in a machine-readable medium, at least one computer processor and memory unit on the computing device is configured to facilitate the interactions between software and machine-readable medium. The computing device may be a user's mobile device 111 or the object's responsible party's mobile device 113 or desktop computer 115.

A user 109 or an object's responsible party 116 may be using a computing device, which may be, but is not limited to, a mobile device such as a mobile phone, laptop, a portable digital assistant (PDA), a smartwatch, a tablet, or a desktop computer. The computing device may install some native mobile applications such as an end-user mobile application or a generic camera application, a generic barcode reader application, a generic NFC application, a generic mobile web browser application, or other applications. The computing device is configured to process data, store data and access networks. In some embodiments, the user's device may comprise a display function to display information in the form of user interfaces. In some embodiments, the user's device may comprise touch screens, microphones, global position systems (GPS), cameras, etc. When network is enabled on the user's device, communication may be initiated for a user to interact with an object through a physical identifier or by a computer vision system. A user 109 may use a mobile device 111 to request and receive information. If an object 101 is identified and an AI agent 103 is available, the AI agent 103 can immediately present relevant information to the user's mobile device 111. If the AI agent 103 is not available or in deactivated mode, the communication will not proceed.

A mobile application 110 installed on a mobile device 111 may be used to interact with an object 101. When a user 109 makes a request through a physical identifier 102 and a mobile application 110, the AI system 104 follows the instructions to trigger an AI agent 103 linked to the identifier 102. If an AI agent is activated, the system 100 will immediately identify, render, and transmit data related to the AI agent 103 and the identified object 101 to the user's mobile device 111. In some embodiments, the mobile application or the web application in the system offers various features catering to different types of users. For example, a client can view an AI agent's activities as detailed information available through a web-based dashboard. End-user 109 can receive reward points when they interact with the AI agents. The map view on the mobile application 110 can display the GPS location when the user interacts with a stationary object. The end-user 109 can review the dialogs with AI agents from the chat history.

In one embodiment, if a user 109 does not want to share individually identifiable information such as name, email, phone number, etc., they may use a third party native mobile application such as a generic barcode reader or a generic NFC reader to interact with a physical unique identifier 102 attached to an object 101 without registering a user account in the system. In yet another embodiment, if a user does not want to use the generic machine-readable reader applications to interact with an object 101, they can download and install an end-user mobile application to access the system and communicate with an AI agent. Further, a user is required to provide necessary credentials in a variety of ways, such as username and password, fingerprint recognition, voice recognition, facial recognition, or a combination of them. After logging in, the user 109 can use a mobile application's 110 activation function to start a conversation with an activated AI agent 103. The user 109 can respond to the AI agent 103 via voice, text messages, video, or a combination of these means. The user 109 can decide to follow the AI agent's 103 instructions until the end of the conversation or terminate the conversation and disconnect with the AI agent 103 at any time. In addition, the system 100 can offer different functions on the applications based on the users' role. For example, a registered user, such as an object's responsible party 116, may modify the object KB 303. If this user were granted an editor role, the user could modify one or more object's properties or corresponding knowledge base using a mobile application 112 designed for the object's responsible party 116. The changes would be updated in the object KB 303 in real-time.

A network 117 and a server 108 are provided in the system 100. The network 117 may be a local area network (LAN), a wireless LAN (WLAN), a wide area network (WAN), a wireless WAN (WWAN), a virtual private network (VPN), or other internet or mobile carriers. The server 108 may be a cloud-based system comprising one or more processors or computers, storage devices, or similar computer arrangements that are operated by or facilitate communication and processing for multiple clients in a network environment. The server 108 may provide server-side functions through the network 117. The server 108 may further communicate with one or more third-party servers and/or one or more computing devices. The APIs, mobile applications, web applications, an AI system 104, and subsystems (e.g., a notification system, a reward system) may be interactively coupled with one or more databases (e.g., an AI agent database, object KB, a user database, and a client database).

The system 100 may include one or more storage devices such as a database 105 to store various data. One or more databases store data related to objects, agents, or other entities. One or more databases may further store data related to third-party applications, third-party servers, computing devices, end-user applications, client applications, etc. One or more databases may include cloud-based storage or device-based storage. For example, the database 105 in the system 100 comprises an object KB 303 storing relevant information (e.g., object descriptions, expert's knowledge) associated with one or a plurality of objects, an AI agent database stores information (e.g., AI agent's descriptions, AI agent's functions, AI agent's activities, AI agent's performance scores) associated with one or a plurality of AI agents, and a user and/or a client database storing information associated with all registered users.

An object KB 303 as a database is configured to store relevant information related to objects, such as a set of predefined object's properties—a seed knowledge (also referred to as domain knowledge or expert knowledge). The associated properties of an object may include an object's unique identification number, the name of the object, the manufacturing date of the object, the ownership of the object, the current object's location, the user experience of the object, the failure mode of the object, the category the object belongs to, and the images of the objects. The seed knowledge includes a set of most asked questions associated with the object and the corresponding responses. The object's responsible party may populate seed knowledge through a mobile application 112 or a web application 114. The object's responsible party may share their domain knowledge of prior experience in manipulating or interacting with the object or responding to the object users' inquiries. For example, a customer service representative who has rich customer service experience in response to various customer inquiries may supply this experience as seed knowledge. The frequently asked questions and the corresponding appropriate answers are part of the customer service representative's knowledge stored in the memory or documents. The frequent questions and answers can be used to build the seed knowledge in the object KB 303.

Furthermore, object KB 303 may be updated by an AI agent using the data collected from the conversations with new users who interact with the same object. The object KB 303 is updated while AI agents are learning from a user's interactions. In the beginning, the AI agent uses the seed knowledge in the object KB 303 to respond to the users. The seed knowledge contains one or more predefined common or frequently asked questions having answers in the object KB 303. If the AI agent analyzes and identifies the trends of the users' queries that deviated from the seed knowledge, it will generate new responses and update object KB 303. In some embodiments, an object's responsible party may or may not be required to contribute the responses to a user's new inquiries to improve the object KB 303.

An AI agent 103 is configured and provided to conduct a conversation related to an identified object via auditory or textual methods with a user, enabling any physical objects to be conversable and assisting a user automatically. An AI system 104 is required for generating and operating one or many AI agents as detailed further in FIG. 2. AI agents may be developed or created to have various functions. An AI agent may be created for performing one task using one function or using each function of a subset of the functions of the AI system. For each AI agent, a conversational or dialog flow may be configured to respond to a variety of user input. The AI agents can determine the steps, contents, and conditions in a dialog to respond to a user's request by following the rules of dialog flow. For example, when an AI agent communicates with a user's mobile device, a user may ask questions or makes requests related to an identified object using plaintext, audio, video, or images. The AI agent may determine if it needs to respond to the user and what contents should be presented to the user's mobile application if a response is required. The data from multiple sources such as the object KB, and APIs may be retrieved and used to generate a response to the user in the context of a conversation.

A notification system 106 is configured to transmit data across one or more applications, AI system, and servers, to one or more users in real-time through a network 117. An AI agent may activate a notification (e.g., a new user inquiry submission, updated work status/priority, deadline reminders, etc.) associated with a registered user based on the information received from the system. The AI agent determines who should receive the notification, when to send a notification, and what should be included in the notification. The notifications are sent through a notification system 106 to users' mobile applications, client's web applications, or registered emails via APIs. For example, an object's responsible party can access the notifications associated with their accounts or objects through a client's mobile application or a client's web application. In some embodiment, an object's responsible party may be a property owner, a service provider, a retailer, a reseller, or a manufacturer, that provides goods or services to a customer (also referred herein as an end-user). When the object's responsible party creates a new AI agent associated with a uniquely identified object, a set of data such as object's properties, responsible party's properties, seed knowledge, and business rules are defined.

A reward system 107 is configured to communicate with a mobile application or a web application to incentivize the users who utilize the system to communicate with identified objects and the associated AI agents. The reward feature motivates users in a way that users may receive rewards when they communicate with AI agents and the identified objects in the system. The user input information may be beneficial to the object's responsible party and the object KB. According to one embodiment, a reward feature is included in the end-user application 110 to incentivize the user after the user interacts with an object. For example, when a user reports an issue related to an object using the current system, the user will be rewarded, for example, by a point system by deposited points in their accounts. They can redeem the points in exchange for cash reward, goods or services provided by the system, or they can transfer the points to other users.

Figure 2:
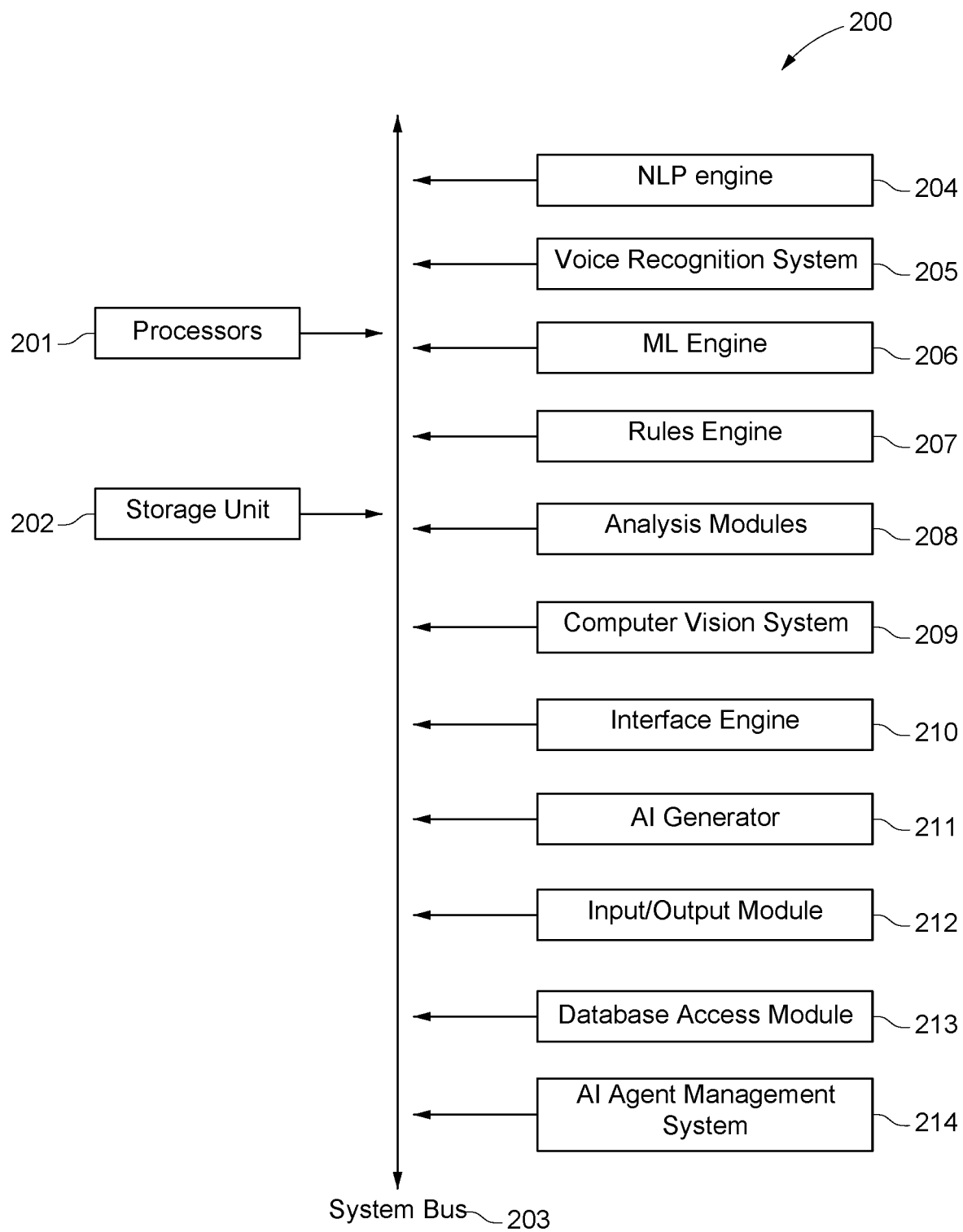
FIG. 2 is a block diagram illustrating an AI system configuration.

FIG. 2 is a block diagram illustrating an AI system configuration 200. The AI system 104, which may reside remotely on the cloud server, a remote node, or a collection of nodes is provided to support the intelligent communication system. Shown is an AI system 104 comprising processors 201, a storage unit 202, a system bus 203, an NLP engine 204, a voice recognition system 205, an ML engine 206, a rule engine 207, analysis modules 208, a computer vision system 209, an interface engine 210, an AI generator 211, an input/output module 212, a database access module 213, and an AI agent management system 214. All components in the AI system 104 are interactively and communicatively coupled via the system bus 203. Additionally, the AI system 104 operates as a standalone system or can be networked or integrated with other systems or computing devices.

The processors 201 include at least one computer processor, one or more memory units (e.g., a main memory, a static memory), and instructions. The processors 201 are configured to provide data processing for the various software, modules, and other components described herein. The input/output (I/O) module 212 is configured to communicate with one or more systems or programs by receiving input, providing output, producing output, transmitting information, and exchanging information. The storage unit 202 is configured to store data accessed by one or more modules or other systems. Data may be distributed and stored in different storage devices. For example, some data may be stored on the users' devices, object KB, or on a separate database on a remote server. The AI system 104 can access data from various resources in real-time through a database access module 213 and APIs. For example, the AI system 104 may communicate with one or more applications, including third-party applications running on third-party servers and a database 105 to retrieve additional relevant data and functions through networks 117. Then the AI agents can use these data and function in addition to existing data, to provide more efficient and accurate communication and services. A storage unit 202 comprises machine instructions accessible to the processors via a system bus 203.

The NLP engine 204, ML engine 206, and analytics module 208 are essential components that enable and improve AI agent's abilities of "thinking and acting" logically to achieve the best outcome. The NLP engine 204 is configured to receive and process user input in the form of natural language by executing one or more NLP tasks. It further determines the meaning of natural language by implementing one or more natural language processing algorithms to parse and analyze the user input. It may also implement one or more advanced topic mining and modeling techniques to enhance the accuracy of natural language understanding. The NLP tasks may include parsing, part-of-speech tagging, sentence breaking, stemming, word segmentation, terminology extraction, grammar induction, lexical semantics, machine translation, named entity recognition (NER), natural language generating, natural language understanding, relationship extraction, etc. AI agents may use one or more NLP tasks and one or more NLP algorithms and modeling techniques to dynamically generate responses to a user's questions, which has no predefined answer in the object KB. In some embodiments, a user may have a conversation with an AI agent by providing plain texts. The AI agent may apply one or more NLP tasks, algorithms, modeling tools to process and derive meanings from the user's plain text input. In some embodiments, in which user's voice command is provided as input, the voice recognition system and one or more speech recognition algorithms may be applied by AI agents to convert user's voice input to plain texts that can be parsed and processed to structured data for analysis.

In some embodiments, an NLP engine 204 interactively communicates with the ML engine 206 to increase its accuracy in understanding the meaning of user input. The ML engine 206, NLP engine 204, and database 105 are further utilized to predict user intent, behavior, and topics most likely in communication. An ML engine 206 is configured to use the historical interaction and communication data to predict the current interactions between the user and the object. The data includes the conversation logs, user's response time, locations, and timestamps where or when the communications were initiated, user's behavior data such as frequent requests, and commonly reported issues. The ML engine 206 may apply supervised learning or semi-supervised or unsupervised algorithms and modeling techniques to predict user intent and interactions. One or more data sources such as the outputs from the ML engine 206, object KB 303, or data received from APIs may be utilized by the analysis modules 208.

The analysis modules 208 is configured to support an AI agent's learning and analytical capabilities with advanced analytical tools. The analysis modules 208 is in cooperation and in communication with each other to perform data mining, data selection, data cleaning, data transformation, training dataset construction, or other tasks. In several embodiments, the first step of analysis involves selecting data from the data sources. Depending on the specific applications or use cases, a training dataset may be required and constructed by collecting data from one or multiple data sources or a subset of data selected from one or more data sources. In the machine learning or statistical modeling, a training dataset is used to build a model (e.g., unsupervised model, supervised model, hybrid machine learning model). The training dataset may be stored in the database and/or updated by the AI system during a period according to one or more defined rules for future use. The training dataset may represent a set or a subset of a large dataset from one or more data sources. They may be compiled from data sources in various formats. A data cleaning step may be required before performing any analysis or modeling tasks. Data transformation may be required to transform a training dataset to meet the format, structure, or values of data requirements. In addition, filling in missing data for the training dataset may be required.

Further, the analysis modules 208 interactively communicates with other modules, engines, and databases in the AI system. In one embodiment, an AI agent receives user's queries which may be in the form of a search keyword, a message, or a symbol, one or more analysis modules may be used along with NLP and ML to verify, formulate, or validate user's queries for the AI agent to determine an accurate response. In another embodiment, one or more analysis modules may be used to perform statistical data analysis, case-based reasoning, inductive learning, or visualization. In an alternative embodiment, one or more analysis modules, along with a rules engine 207 to conduct predictive modeling and data analysis, reasoning, and inductive learning for AI agents to perform rationally. A computer vision system 209 may interact with analysis modules 208 to provide object recognition and identification analysis using image data in another embodiment.

A computer vision system 209, which cooperates with a mobile device or a desktop, a user interface, an object KB, API, and a remote server, enables an AI agent to "see" an object of user's interest. Computer vision system 209 is configured to construct explicit and meaningful descriptions from indications of physical objects in a form of images captured by a user's mobile device. The goal of the present computer vision system 209 is to analyze object image data collected from the environment and identify an object registered in the object KB. The object identification tasks using a computer vision system 209 may be divided into a few steps, including data acquisition, data analysis, classification, comparison, identification, and confirmation. The data acquisition involves capturing images in a selected environment. In one embodiment, a user uses a mobile device having a camera and an end-user mobile application to process image data. When a user wants to communicate with an object, they may use the object recognition function in the end-user application to capture one or more images of the object and its environment. The object image, along with some background images, are captured, processed, and sent to the server. The computer vision system 209 in the AI system 104 on the server 108 further process the image data, analyze them using a model-based object recognition algorithm. The registered objects in the object KB are used as models to compare with the objects recognized in the system. If multiple objects are identified from the images by the computer vision system, the user may see bounding boxes around the identified objects on the graphical user interface (GUI). Users may select one of the identified object by touching one of the object images on the GUI. A user may connect with an AI agent associated with the identified object for communication as soon as an identified object is selected and confirmed by the user.

A rules engine 207 is configured to have a set of dialog rules and business rules accessed by an AI agent. It determines an AI agent's actions to be performed under certain conditions. Generally, the dialog rules include conditions and actions. The rules state what action an AI agent should perform when a condition is met. The user's input, whether it is expressed in natural language or a predefined query selected by the user, is processed by an AI agent using NLP. The rules engine uses the user input or user commands for the AI agent to evaluate the conditions and take the actions. The actions may include but are not limited to responding to the user request, updating the object KB, or sending a notification to the object's responsible party. Additionally, the AI agent's responses will be different based on the results of analyzing a user's role, scenario, and prior user interactions with the identified object. For example, when a user starts communicating with an identified object, the AI agent evaluates the current conditions, including but are not limited to the time of the conversations, the distance between the user's GPS location and the object's GPS location, whether the questions are related to the object, or whether the user's requests have been received recently. Then the AI agent searches rules for the mapping actions related to the current conditions. The actions are defined in a sequence of executable instructions.

An interface engine 210 helps clients define the first interface associated with an identified object and a user interface as the second interface. The first interface refers to a physical object identifier associated with an identifiable object. In one embodiment, the object's responsible party can use a machine-readable code generator application to generate unique identifiable optical machine-readable codes such as barcodes, or QR codes. The codes are printed in the form of labels or tags and attached on the surface of the objects. The machine-readable code has a set of computer-executable instructions, which are connected to a unique AI agent and its associated object KB. A user may see a unique QR code label attached to the object and use a generic barcode reader application or an end-user mobile application 110 to trigger an AI agent associated with the object. In another embodiment, an NFC tag can be installed on the object as a physical identifier and an interface to access an AI agent. The user may use a generic NFC application or an end-user mobile application 110 to communicate with the NFC. Alternatively, a physical object may not have any physical identifier. When a user uses a mobile device camera to capture the images of the physical object, the images are sent to the server and analyzed by a computer vision system with advanced object recognition algorithms. If a matched object is recognized and found in the object KB, the system will identify the object and execute a set of instructions and connect the AI agent to the user's mobile device.

The second interface refers to an interface provided to a user or an object's responsible party via a computing device. The second interface includes a voice-based conversational user interface, a graphical conversational UI displayed on a computing device for a user to interact with an AI agent, or a combination of both. The system can justify user's role based on the predefined criteria, such as the user's credentials, the geographical location of the user when the user accesses the system with an object, and the type of applications used by the user to access the system. The system can further display different user interfaces with various features and functions based on user's role. For instance, an object's responsible party scans a machine-readable code attached to an object using a mobile client application. Given the AI agent associate with the object is available, an AI agent detects the user's role as an object's responsible party 116. A dashboard may be displayed on a GUI to the object's responsible party's mobile device. Alternatively, when an end-user 109 scans the same machine-readable code using a generic machine-readable code reader (or decoder) application, the system recognizes the user as an anonymous user. In this case, the AI agent cannot access any user's personal information. It will not display some features such as a dashboard, and real-time notifications to an anonymous user through the user interface.

The GUI may be presented in a conversational style, a simple web form, or a hybrid style. In some embodiments, the GUI may include checkboxes, buttons, or text input fields for a user to have a simple and short conversation with an AI agent. The AI agent may request the user to respond to the system using voice, texts, or uploading files which may include image files, audio files, video files, plain-text documents, or other types of files in the conversation.

In some embodiments, the mobile device displays a GUI as soon as the user connects with an AI agent. The GUI may include messages, images, icons, buttons, a search bar, a form, an input field, or other elements. The messages may be system-generated, AI agent's responses, or user's inputs. The image may be uploaded by the object's responsible party through a client mobile application, a web application, or shared by the user. The icons may be statics symbols, emojis, or animations. The buttons may refer to the clickable and responsive objects in the applications. The user can use a form or an input field to enter texts, numbers, or punctuations as well as special characters or symbols. In some embodiments, a search bar is available on the GUI for a user to search anything on the screen. In some embodiments, the conversation can be voice-based such that the user may interact with an AI agent using a mobile device having a voice assistant feature on an end-user mobile application.

An AI agent generator 211 is provided by AI system 104 to configure a plurality of AI agents. In the process of configuring an AI agent, the AI agent generator 211 automatically assigns an AI agent with a unique identifier that identifies the AI agent among a plurality of different AI agents. The unique identifiable AI agent is registered in the AI agent database and associated with a uniquely identifiable object registered in the object KB. Each AI agent may be associated with one AI agent model. The AI agent models are referred to as the names of services or processes for using AI agents, plus the specified characteristics or goals of AI agents. For example, a feedback collector AI model has a name called "Feedback collector"; the purpose of implementing this AI agent model in an AI agent is to collect customer feedback; the predefined characteristics or personalities may be referred to as a female who is in the age of twenty using a delightful voice; the predefined goals may include conducting a concise dialog to collect customer's feedback on an identified product. Once an AI agent model is selected, a unique object and an interface are assigned to the AI agent. A client can use a mobile application or a web application to send a request to the AI system to generate a new AI agent. Alternatively, the client may create their own AI agents without using any predefined AI agent models. The AI generator provides a tool kit for clients to configure customized AI agents. The AI builder toolkit may be accessible through a client's mobile application 113 or a web application 115. The AI builder toolkit provides persona modules, dialog rule modules, interface options, or functions for AI agents to provide services.

An AI agent management system 214 comprises several modules and tools for configuring and managing AI agents. For example, the system provides tools to customize AI agents with various characteristics such as personas, dialog rules, and interfaces. AI agent state modules may be utilized to activate or deactivate AI agents. Performance measurement may evaluate AI agent and user interactions with quantitative or qualitative measurements such as satisfaction scores, response time, accuracy in response, effective service hours, etc. An agent functionality module may be utilized to select one or more functions that AI agent can execute to meet one or more business requirements such as the location of service, languages (e.g., English, Spanish, Japanese, etc.), or tones used in the conversation, duration of the conversation, priority, etc. Either a system administrator or an object's responsible party who manages or owns the identified objects can use the AI agent management system to configure one or more AI agents to meet business requirements and needs.

Figure 3:
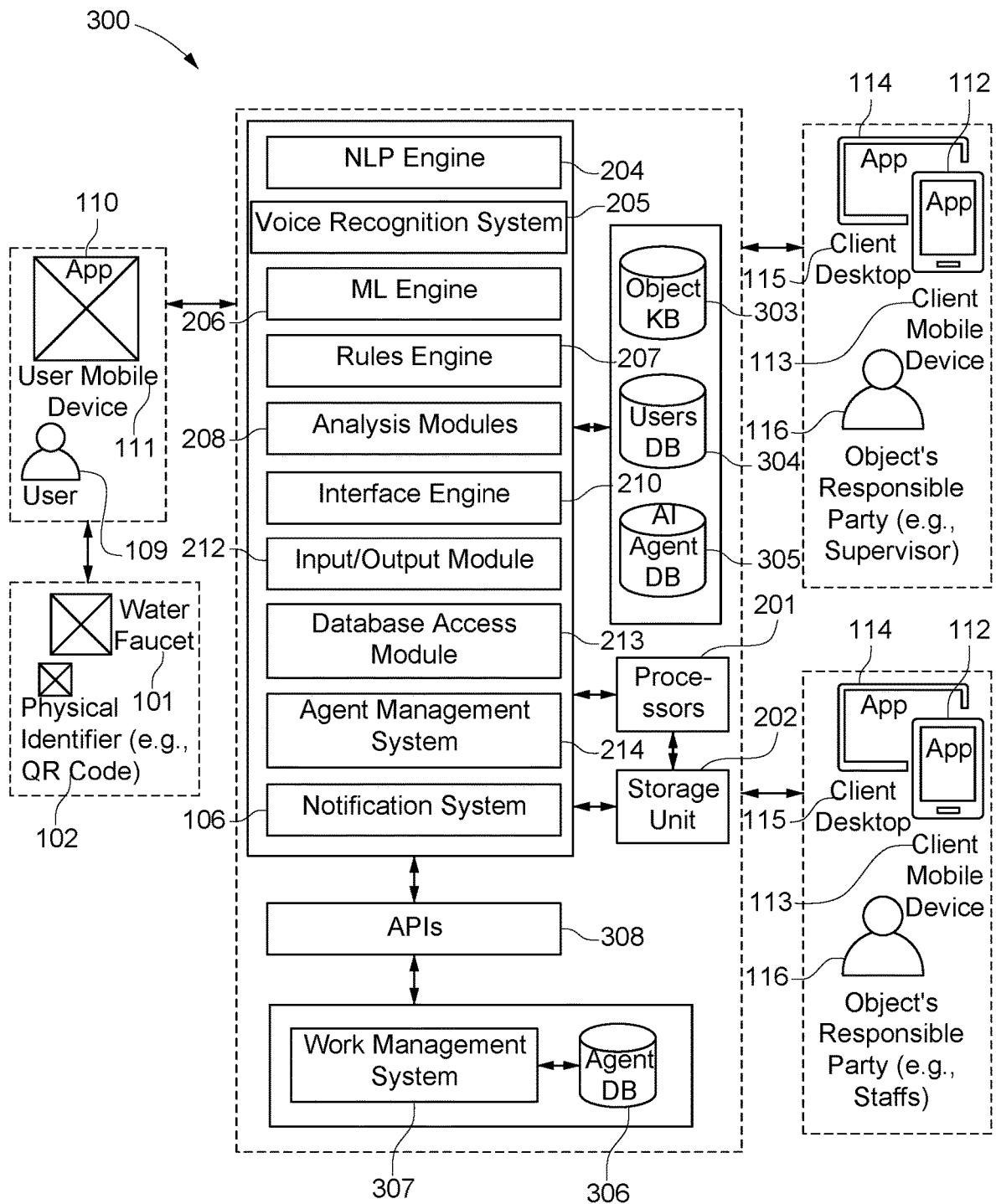
FIG. 3 is a block diagram of a second intelligence communication system in another embodiment of the present invention.

Referring next to FIG. 3, a block diagram of the second intelligence communication system in another embodiment of the present invention is shown. Shown are system 300, including, an NLP engine 204, a voice recognition system 205, an ML engine 206, a rules engine 207, analysis modules 208, an interface engine 210, a database access module 213, AI generator 211, I/O module 212, an AI agent management system 214, a notification system 106, processors 201, a storage unit 202, an object KB 303, a user database (DB) 304, an AI agent DB 305, an asset DB 306, a work management system 307, and service APIs 308.

The system 300 is configured to enable a user 109 to communicate with an identified object (e.g., a water faucet) 101 and its associated AI agent 103 (FIG. 1) to get instant help. Through a user mobile application 110 and service APIs 308 over a network 117, user 109 can interact with an AI agent 103 to report an issue of an object 101 by scanning a physical identifier (e.g., QR code) 102 attached on the object 101 using a mobile device 111 with a camera.

A physical identifier 102 is provided by the object's responsible party 116 (e.g., facility team supervisor) and attached on the exterior surface of object 101. A set of computer-executable instructions stored in a physical identifier 102 is encoded in a machine-readable format. Users can use their mobile devices to scan a physical identifier using a generic machine-readable code decoder mobile application 110 or an end-user mobile application 110 with a machine-readable code scanner function. The physical identifier 102 is generated by the system 300. It is a predefined interface when an AI agent is created and associated with the object. Therefore, the object is identified by the system 300 with a physical identifier 102 once a user 109 interacts with the object 101 using a mobile application 110. The information related to an object such as the name of the object, the model of the object, the manufacturer serial number (MSN), the geolocation of the object, the common issues reported by other users, etc. can be obtained from the object KB 303, an asset DB 306, a database access module 213, and service APIs 308.

An AI agent 103 provided by the system is configured to provide service to the user and the object's responsible party. If an AI agent associated with the object is activated, a user can access the AI agent on a remote server instantly. The AI agent receives a user's request through the mobile user application and automatically identifies the object. With a user's permission, some user-related data such as current geolocation of the mobile device, the model of mobile device, the device ID, network, and notification settings may be automatically determined by the system. If an end-user mobile application is used to interact with the physical identifier, the user is automatically identified as a registered user by the system. AI agents can obtain some user information such as a profile image, name, phone number, email for sending notifications.

Similarly, AI agents can automatically determine if a notification needs to be sent to the clients (e.g., facility team supervisor, staff) through a mobile application or a web application. In addition, AI agents can determine what should be sent in the notification and who will receive the corresponding messages. The rules engine, notification system, and work management system are interactively communicated with AI agents for sending information. For example, through service APIs 308, an AI agent 309 and the object's responsible party 312 can access a work management system 307 to access information related to facility team, work schedule, work orders, dispatching status, etc. The AI agent can use the information stored in the work management system 307 to send notifications to registered users who are the subject matter experts.

When a user 109 interacts with an AI agent 103, the user interface and the information presented on the mobile device are determined using one or more engines or modules in the system such as the NLP engine 204, voice recognition system 205, the ML engine 206, the interface engine 210, the analytics module 208, and rule engine 207. In one embodiment, the interface engine 210 is configured to assign a QR code as a machine-readable code to the identified object as an interface. Further, it includes a conversational user interface on the user's mobile application.

The NLP engine 204 is configured to provide natural language processing. It is coupled with an ML engine 206 and analysis modules 208 for an AI agent 103 to understand a user's input. The analysis modules 208 provides aspect analysis, sentiment analysis, text analysis, and scenario analysis. The user input data may include texts, non-text characters, or other data collected from user interaction with the conversational AI agent through a conversational GUI. For example, the conversational GUI may include buttons, checkboxes, etc. The user interaction may include tapping or pressing a button on the screen, entering characters in the text input field, uploading images, and so on.

The user interaction data may be included in the notification sent to the client's mobile application 112 and web application 114. Based on the user's input and the analysis, the AI agent 103 may determine to send separate messages to different clients based on their roles. The roles engine 207 and work management system 307 are configured to assist the AI agent and an object's responsible party, such as a supervisor to determine when to dispatch the staff and how to distribute work orders. For example, an AI agent 103 determines an issue reported by a user 109 needs human agents to work on it. A notification with priority, status, descriptions of the issues may be sent to the facility staff and a supervisor. The user 109 uploads files, such as images for the broken object, which may be used by the AI agent 103 for analysis and justify the user's request. For example, the user's uploaded image and the user's current geolocation may be used to compare with the object image and object's service location in the object KB 303.

With a client's mobile application 112 or a web application 114, the facility supervisor and staff can use features designed for the client on the mobile or web application to obtain information. For example, they may review the conversation histories between AI agents and users. In addition, they can check agents' activities (e.g., number of conversations during a day, number of unique issues reported), then take actions based on the issue analysis performed by AI agents. The facility team can update the work status and leave comments through the applications once they resolve the issues. The system will process the data, update the database, and send notifications to AI agents and other related parties in real-time.

Figure 4:
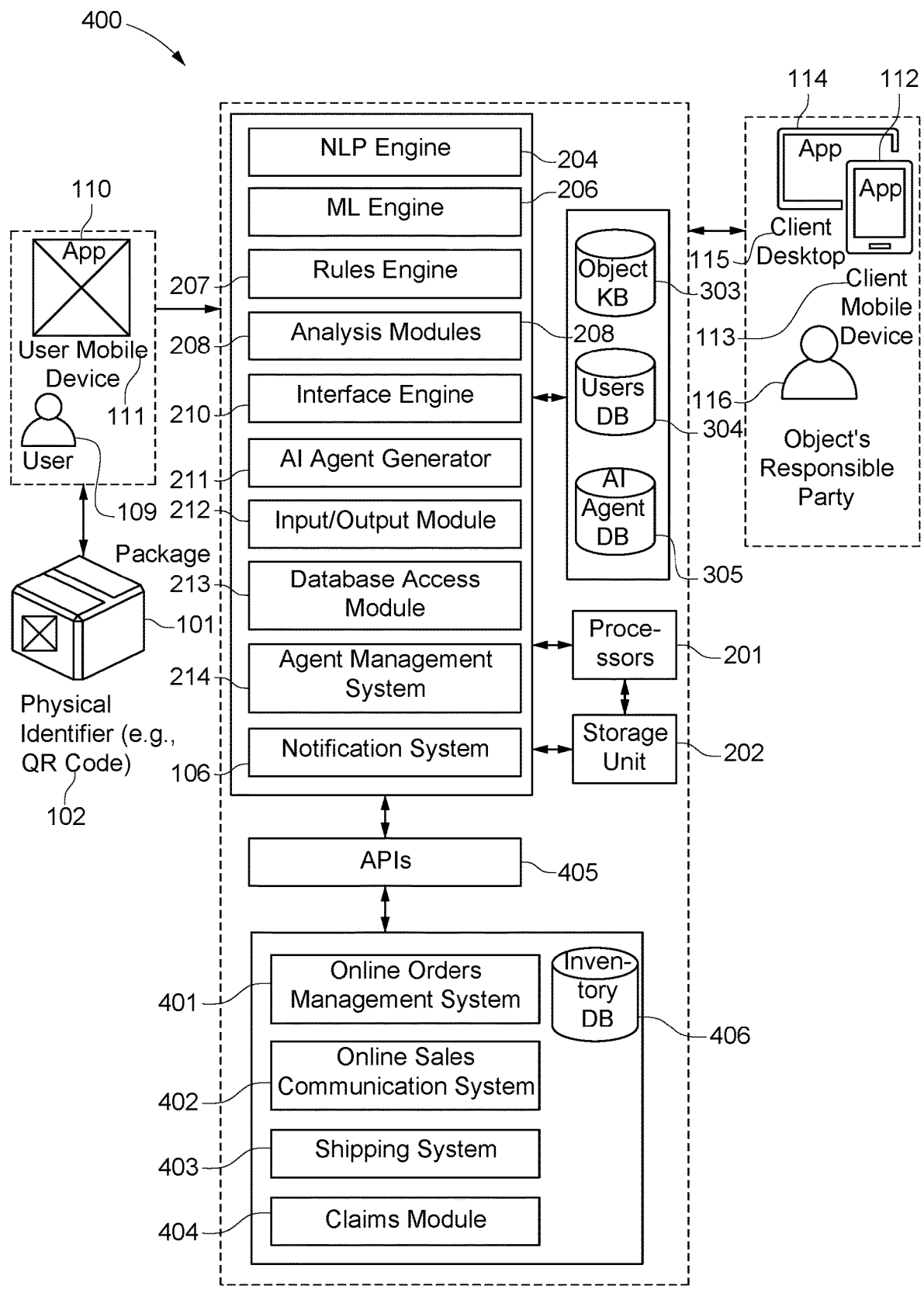
FIG. 4 is a block diagram of a third intelligence communication system in another embodiment of the present invention.

Referring to FIG. 4, a block diagram of the third intelligence communication system in another embodiment of the present invention is shown. Shown are a system 400 comprising a physical identifier (e.g., QR code) 102 attached to an identified object (e.g., a delivered online order package) 101, an NLP engine 204, an ML engine 206, a rules engine 207, analysis modules 208, an interface engine 210, an AI generator 211, I/O module 212, a database access module 213, an agent management system 214, a notification system 106, processors 201, a storage unit 202, an object KB 303, a user DB 304, an AI agent DB 305, an online order management system 401, an online sales communication system 402, a shipping system 403, a claims module 404, service APIs 405, and an inventory DB 406.

In one embodiment, an e-commerce business implements the intelligence communication system for automated customer service. A user 109 accesses a remote AI agent (not shown) 103 by scanning a physical identifier 102 on a delivered order package 101 using a mobile application 110 installed on a mobile device 111. If the AI agent is activated, the AI agent 103 can instantly communicate with the user regarding the order issues. The agent can access object KB 303, inventory DB 406, e-commerce back-end systems (e.g., online order management system 401, shipping system 403, online sales communication system 402, etc.) through APIs 405 without asking the user to provide any detailed information about the order. The AI agent is configured to automatically obtain relevant information such as order information, shipping status, product descriptions, buyer information from object KB, back-end system, and external databases such as inventory DB. The e-commerce business 116 can access relevant information provided by the user and the AI agent through the client's mobile application or web application.

When an AI agent receives a user inquiry associated with some predefined questions related to an order, the AI agent retrieves the corresponding predefined answers from the object KB and transmits the information to the user through the mobile application on the user's mobile device. The predefined questions may be common questions asked by the buyers for online orders, and the predefined answers are the most appropriate responses to the related questions. The responses may be constructed from the seed knowledge in the object KB shared by the online seller. If there is no predefined answer in the system to answer the user's new question, the AI agent may use an NLP engine, an ML engine, and a rules engine to generate a response and may continue the conversation by asking for more information from the user. The object KB may be updated in real-time to store the new information collected from the interaction.

The online order management system 401 is integrated with system 400 through service APIs 405 to manage online order data such as order id, order date, items in the order, price of each item, tax, total, shipping name, shipping address, zip code, and buyer email, etc. The online sales communication system 402 is integrated with the system 400 through service APIs 405 to transmit communication messages between buyers and e-commerce businesses. The shipping system 403 is integrated with the system 400 through service APIs 405 to communicate shipping information with carriers. The claims module 404 is included to support users to file claims, for example, purchase related claims, such as, lost packages, damaged items, defective products, unauthorized charges, etc.

When the user interacts with the AI agent, the user interface and the information presented on the mobile device are determined using one or more engines or modules in the system such as the NLP engine, voice recognition system, the ML engine, the interface engine, the analytics module, and the rules engine. In one embodiment, the interface engine is configured to assign a QR code as a machine-readable code to the identified object. Further, it includes a conversational user interface on the user's mobile application.

The data from the user interaction may be included in a notification sent to the client's mobile and web application. Based on the data from the user's input and the analysis, an AI agent may determine if a notification needs to be sent to the e-commerce business. The roles engine is configured to assist the AI agent in determining what to respond to, whether a notification should be generated, when to transmit the notification, and to whom it needs to be sent through the notification system. For example, an AI agent determines an issue reported by the user who needs an e-commerce business's further assistance. A notification with priority, status, descriptions of the issues may be sent to the e-commerce business in real-time. The e-commerce business can access and evaluate the information provided by the user through the client's mobile or web application. The user shared information includes user uploaded files such as images for the damaged order or detailed descriptions about the issues.

The e-commerce business can utilize the features implemented on the client mobile or web application to obtain detailed information about the users, orders, and the agent's activities. For example, they may review a conversation history between an AI agent and a user. In addition, they can check the agent's activities (e.g., number of conversations during a day, number of unique issues), then take actions based on the statistical analysis and summary reports provided by the AI agent. The e-commerce business can update the work status and leave comments through the applications once issues are resolved. The system will process the data, update the database, and send notifications to the relevant parties.

Figure 5:
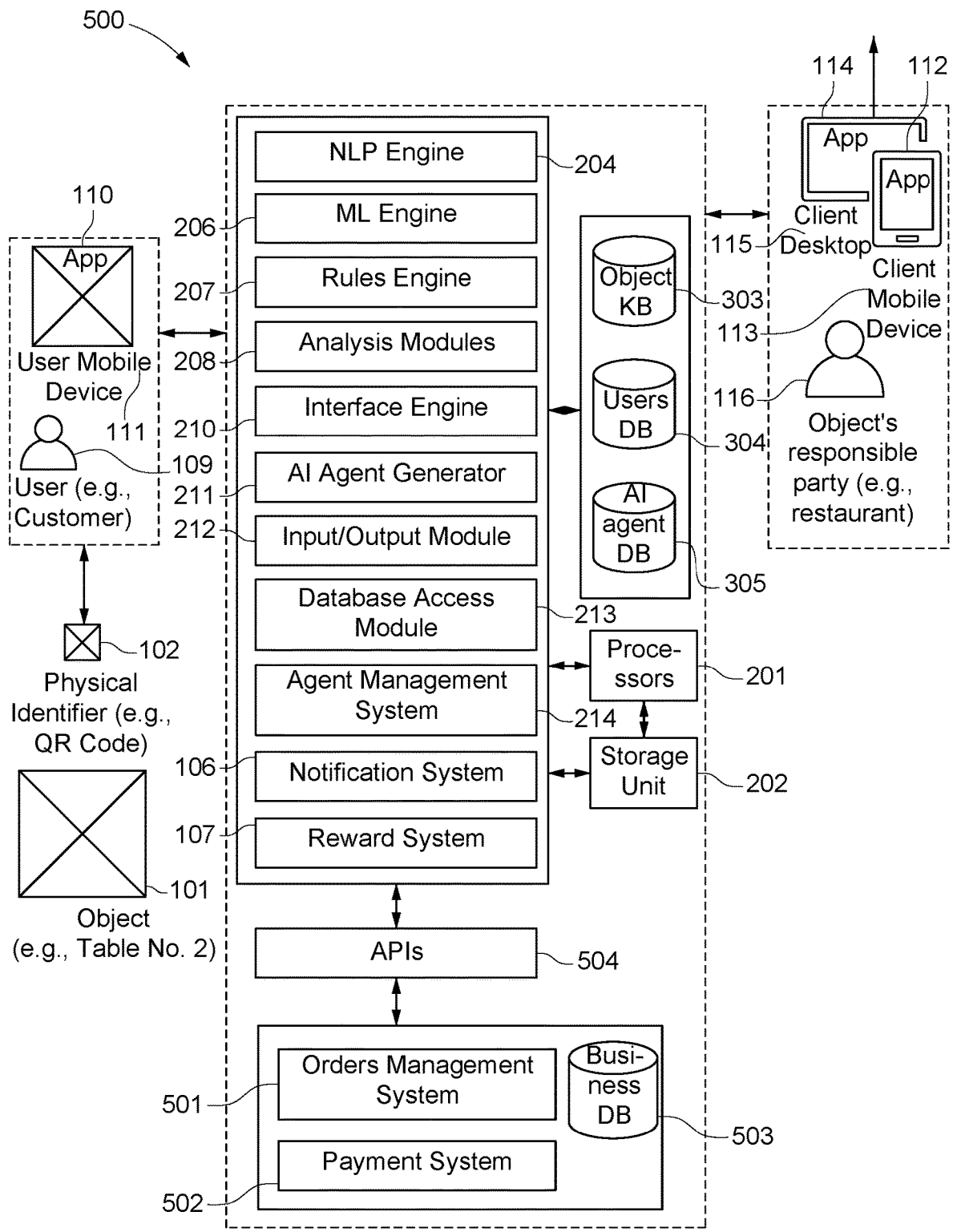
FIG. 5 is another use case diagram illustrating that a user uses the system to order a meal according to one embodiment of the invention.

Referring to FIG. 5, another use case diagram illustrates that a user uses the system to order a meal according to one embodiment of the invention. In FIG. 5, a system 500 comprises a physical identifier (e.g., QR code) 102 attached to an identified object (e.g., Table #2 in a restaurant) 101, an NLP engine 204, an ML engine 206, a rules engine 207, analysis modules 208, an interface engine 210, a database access module 213, an AI generator 211, 1/O module 212, an AI agent management system 214, notification system 106, a reward system 107, processors 201, a storage unit 202, an object KB 303, a user DB 304, an AI agent DB 305, an orders management system 501, a payment system 502, a business database 503, and service APIs 504.

In one embodiment, a user can order food with an AI agent by scanning a QR code label attached on the surface of a dine-in table using a mobile application installed on a mobile device. A service provider (e.g., a restaurant business) implements the intelligence communication system as an intelligent self-serve ordering system for their customers. Without waiting for a human waiter or waitress to take an order, a user can access a remote AI agent through a physical identifier placed or attached on the surface of a table using a mobile application. The AI agent communicates with a physical identifier, databases, an order management system, a payment system to assist a user to place an order instantly. In response to a user inquiry, an AI agent is configured to obtain relevant information such as tasks (e.g., greeting the user, presenting a menu promoting a product, placing an order, or sending notifications), the object's location (e.g., address, detailed location such as table number), a list of menu items, dine-in or to-go options, and so on.

The system 500 communicates with an orders management system 501 via an API 504 to transmit orders information to the respective human agents. The orders management system 501 communicates with business database 503 to coordinate with the respective human agents. For example, a human waiter is responsible for all service requests received from table #1 to table #10. When a customer places an order at table #2 with an AI agent, the order information is sent to the order management system and assigned to the corresponding human waiter. The human waiter can receive the order information, and a digital order ticket through a mobile device and a desktop computer. A ticket printer (not included in FIG. 5) may be connected to the client devices to receive and print the order information. The payment system 502 may be connected via one or more APIs to transmit the transaction data. The transaction information may include order timestamp, AI agent ID, human agent ID and name, location of service, detailed location of the service, mobile payment ID, payment method, service notes, and detailed order information (e.g., ordered items, price, quantity, tax, subtotal, and total).

When the user interacts with the AI agent, the user interface and the information presented on the mobile device are determined using one or more engines or modules in the system such as an NLP engine, a voice recognition system, an ML engine, an interface engine, an analytics module, and a rules engine. In one embodiment, the interface engine is configured to assign a QR code as a machine-readable code to the identified object as an interface. Further, it provides a conversational user interface on the user's mobile application.

An NLP engine is configured to provide natural language processing. It is coupled with a voice recognition system, an ML engine, and analysis modules for AI agents to understand the user input. A voice recognition system is configured to process the user's voice-based input data. A speech-to-text algorithm is implemented to translate the user's voice-based input to plain texts for analysis. The analysis modules provide aspect analysis, sentiment analysis, text analysis, and scenario analysis. The user input data may include texts, non-text characters, or other data collected from the user interaction with the conversational AI agent through the conversational GUI. For example, the conversational GUI may include buttons, checkboxes, images, videos, emojis, etc. The user interaction may include tapping or pressing a button on the screen, entering characters in the text input field, uploading images, recording voices, and so on.

A roles engine is configured to assist the AI agent in determining what to respond to, whether a notification should be generated, when to transmit the notification, and to whom it needs to be sent through the notification system. For example, when a user asks some questions not related to an order that may require more information from a human agent. The AI agent determines a notification needs to be sent to an available human agent who can further assist the user. A specific message related to the identified object is generated and sent to one or more human agents. The message may include issues, priority, status, and descriptions of the object. The human agents can access and evaluate the information provided by the agent through the client's mobile or web application.

In another embodiment, the human agents may utilize features implemented on the client's mobile or web application to obtain detailed information related to users, orders, human waiters/waitresses' activities, and AI agents' activities. For example, they may review the conversation histories between an AI agent and a user. They can check the agent's activities (e.g., number of conversations during a day, number of unique issues reported to an object); additionally, they can review human waiters/waitresses' performance through the dashboard.

A reward system 107 is provided to incentivize a user who uses the current system to place an order. The object's responsible party can configure the rules and policies using the reward system. In one embodiment, a reward policy and rules are defined by the object's responsible party. The user who uses the system to place an order can earn reward points in a registered user account. The system updates the reward points and rewards history in the user account and the object's responsibility's account. The users can access the rewards through a registered mobile application or a web application.

Figure 6:
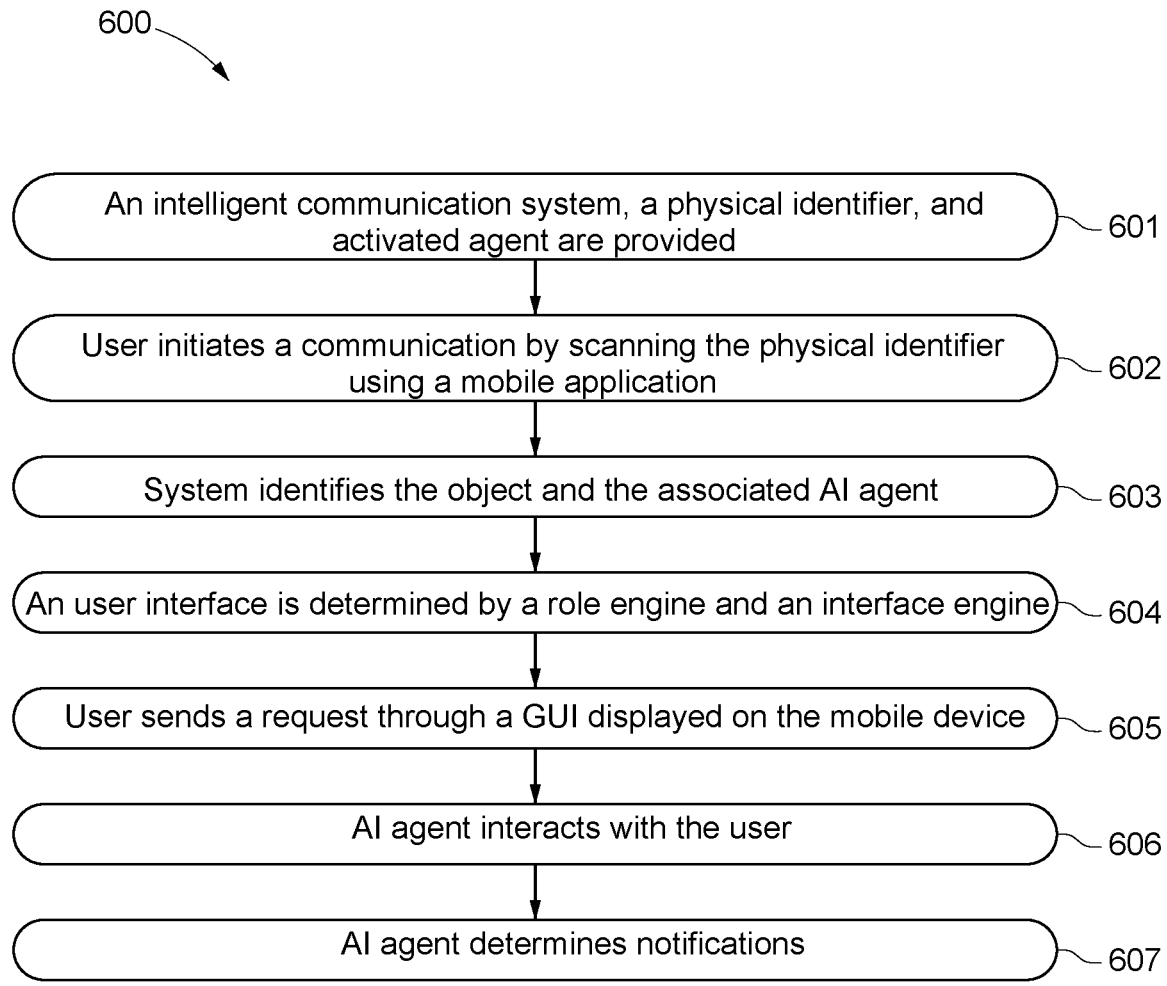
FIG. 6 is a flowchart illustrating a user communicates with an object.

FIG. 6 is the first flowchart illustrates the steps when a user communicates with an object. The flowchart 600 can be used in one or more of the intelligent communication systems 100, 300, 400, 500. Shown is a preparation step 601, a communication initiation step 602, identifying the object and the associated AI agent step 603, initiating user interface step 604, sending requests step 605, the AI agent interacts with the user step 606, the AI agent determines notifications step 607. In the first step 601, a physical identifier is provided and associated with a physical object. An AI agent associated with the object is activated and ready for service. An intelligent communication system is provided to allow a user to communicate with an AI agent with an identified object through a mobile application. In the second step 602, a user initiates communication by sending requests through a mobile application installed on a mobile device. The mobile application has a function to detect if the object has an optical, physical identifier such as a QR code or an NFC tag. Further, the function will decode the information stored on the physical identifier and send a series of computer instructions to the server if a physical identifier is detected. In the next step 603, the system identifies the object and the associated AI agent. If an AI agent associated with an object is activated, a user can instantly connect with an AI agent. The AI agent can interact with the user through conversations. The AI agent can access use the dialog rules for the identified object and information stored in the object KB to interact with the user. In the next user interface initiation step 604, a user interface is determined by an interface and a roles engine. An example of a user interface is a user's role-based conversational UI with a greeting message followed by common questions. That is, the contents generated by the system are based on the user's role.

In the sending requests step 605, the user interacts with GUI on the mobile device to send a request. An example of sending a request may be clicking a checkbox or providing a message. In the AI agent's response step, the AI agent responds to the user based on the object KB and dialog rules.

In the user and AI agent interactions step 606, an NLP engine, an ML engine, or analysis modules may be used by the AI agent to generate relevant information. The user may respond to the AI agent using voice, texts, or uploaded files (e.g., images, video files, text documents, etc.).

In the notifications step 607, the AI agent applies business rules and scenario analysis to determine if a notification needs to be generated and sent. If a notification is necessary, the AI agent processes relevant data and information and send notifications to one or more registered accounts' computing devices. For example, a notification may be sent to an object's responsible party about an issue related to an identified object. The object's responsible party can review the information in the notifications. The information may include who submits the issue, which object is concerned, when the issue is submitted, the conversational histories between the AI agent and the user, and so on.

In another embodiment, there is no completed dialog between an AI agent and a user, even though the user initiates the communication. For example, a user scans a physical identifier using a mobile application. However, they do not send any request, such as a query after scanning the physical identifier. Therefore, there is no further interaction between the user and the AI agent. In yet another embodiment, a communication may be disrupted due to network issues. The system can be reconnected when the network is ready and allow the user to follow the steps described in the flowchart 600.

There are some conditions that must be met before a user can communicate with an object using the system. First, the object must be identified by the AI system. Second, an AI agent must be assigned to the identified object and activated by an object's responsible party or a system administrator. Once these conditions are met, a user can interact with an AI agent to obtain information, request helps related to the object, or receive notifications from the system.

Figure 7:
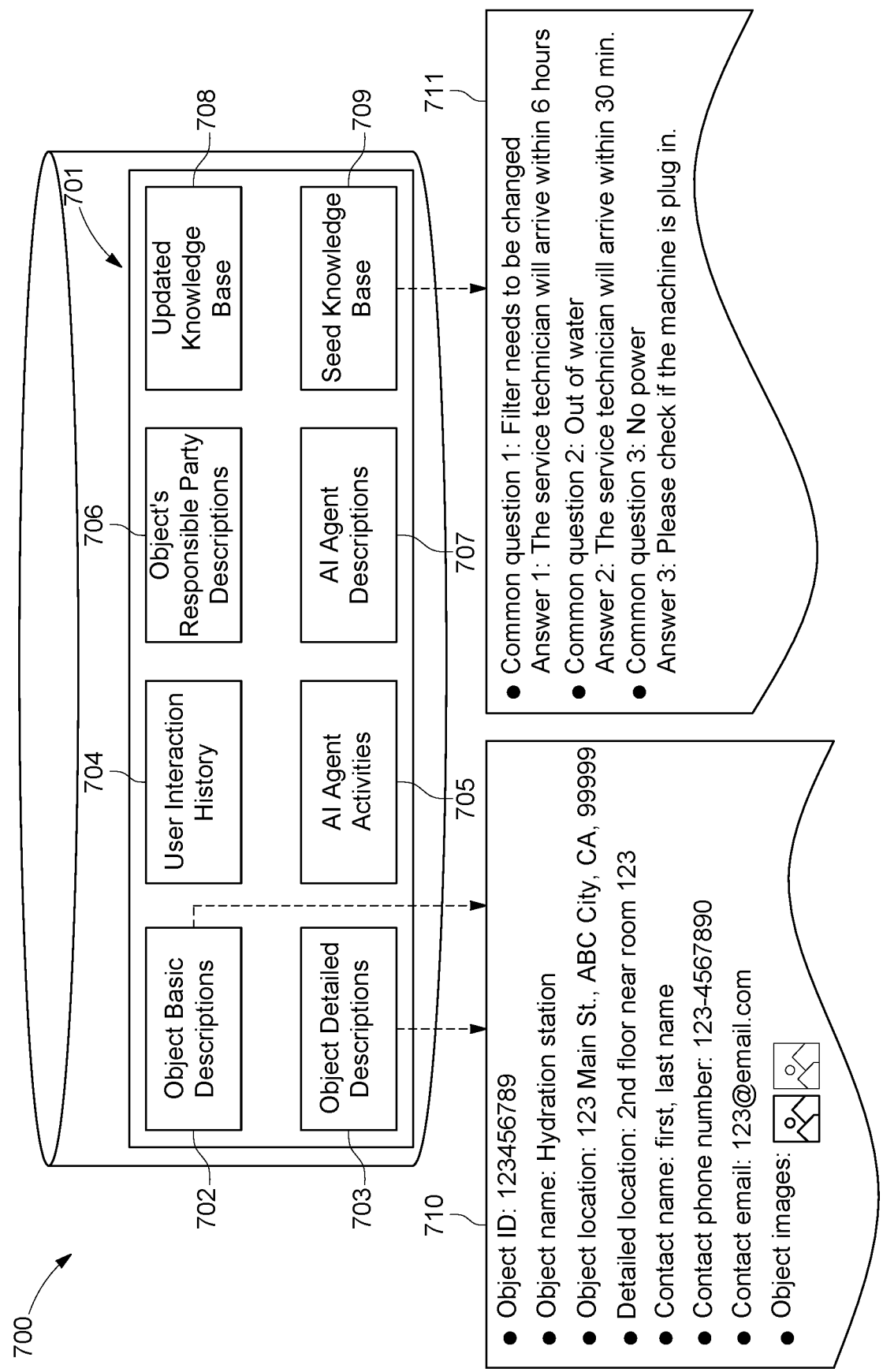
FIG. 7 is a database in the first embodiment of an exemplary intelligence communication system.

Referring to FIG. 7, a database in an embodiment of an exemplary intelligence communication system is shown. Shown are a database 700, which may store a plurality of objects, the first object KB 701 such as 303 found in FIG. 3, an object basic descriptions data file 702, an object detailed descriptions data file 703, a user interaction history data file 704, an associated AI agent activities data file 705, a seed knowledge base data file 709, an updated KB data file 708, an AI agents descriptions data file 707, and the first object's responsible parties data file 706.

The exemplary first object KB 701 stored in a database 700 includes the object basic description data file 702, which includes information such as object identification numbers, object names, MSNs etc. The object detailed descriptions data file 703 includes detailed description information related to objects such as model numbers, weights, sizes, colors, brands, manufacturing dates and time, prices, service locations, detailed service locations, Uniform Resource Locators (URLs) to the image files, etc.

A user interaction history data file 704 includes the interaction histories among a plurality of users, objects, and AI agents. The interaction histories may include one or more records such as dates and time of initiated communication, dates and time of the end of communication, user inputs, user uploaded files, agent identification numbers, communication identification numbers, user inputs, AI agents' responses, notifications, etc.

An AI agents' activities data file 705 includes AI agents' identification numbers, user interface identification numbers, AI agents' deployment dates and time, AI agent's activation dates and time, AI agents' deactivation dates and time, AI agent performance identification numbers, AI agent performance report identification numbers, and so on.

A seed knowledge base data file 709 includes objects' identification numbers, common questions, common questions' identification numbers, responses to the corresponding common questions, the responses identification numbers, dialog rules identification numbers, seed knowledge contributors' identification numbers, seed knowledge initiation timestamps, etc. The seed knowledge is required in the process of creating an AI agent and assigning the AI agent to a unique identified object.

An updated KB data file 708 includes object identification numbers, updated records identification numbers, timestamps for updating the corresponding knowledge, knowledge item identification numbers, knowledge acquisition channels, etc.

An AI agents' descriptions data file 707 includes AI agents' identification numbers, AI agents' interface identification numbers, AI agents' model numbers, personalities descriptions, URLs of the AI agents' image files etc.

The first object's responsible parties' data file 706 includes object's responsible parties' identification numbers, names of the organization, organization category identification numbers, mailing addresses, billing addresses, primary contact names, primary contact phone numbers, primary contact emails, URLs to their social media websites, profile images, registered account emails, etc.

Note that the AI agent database 305, user database 304, and object KB 303 may be constructed in the form of Relational Databases (RDBMS) or NoSQL databases, which are primarily called a non-relational or distributed database. The SQL databases are table-based databases representing data in the form of tables, which consists of a number of rows of data, whereas NoSQL databases are document-based, key-value pairs, graph databases, or wide-column stores which do not have standard schema definitions which they need to adhere to. The server 108 in the system is configured to support both SQL and NoSQL database operations.

Figure 8:
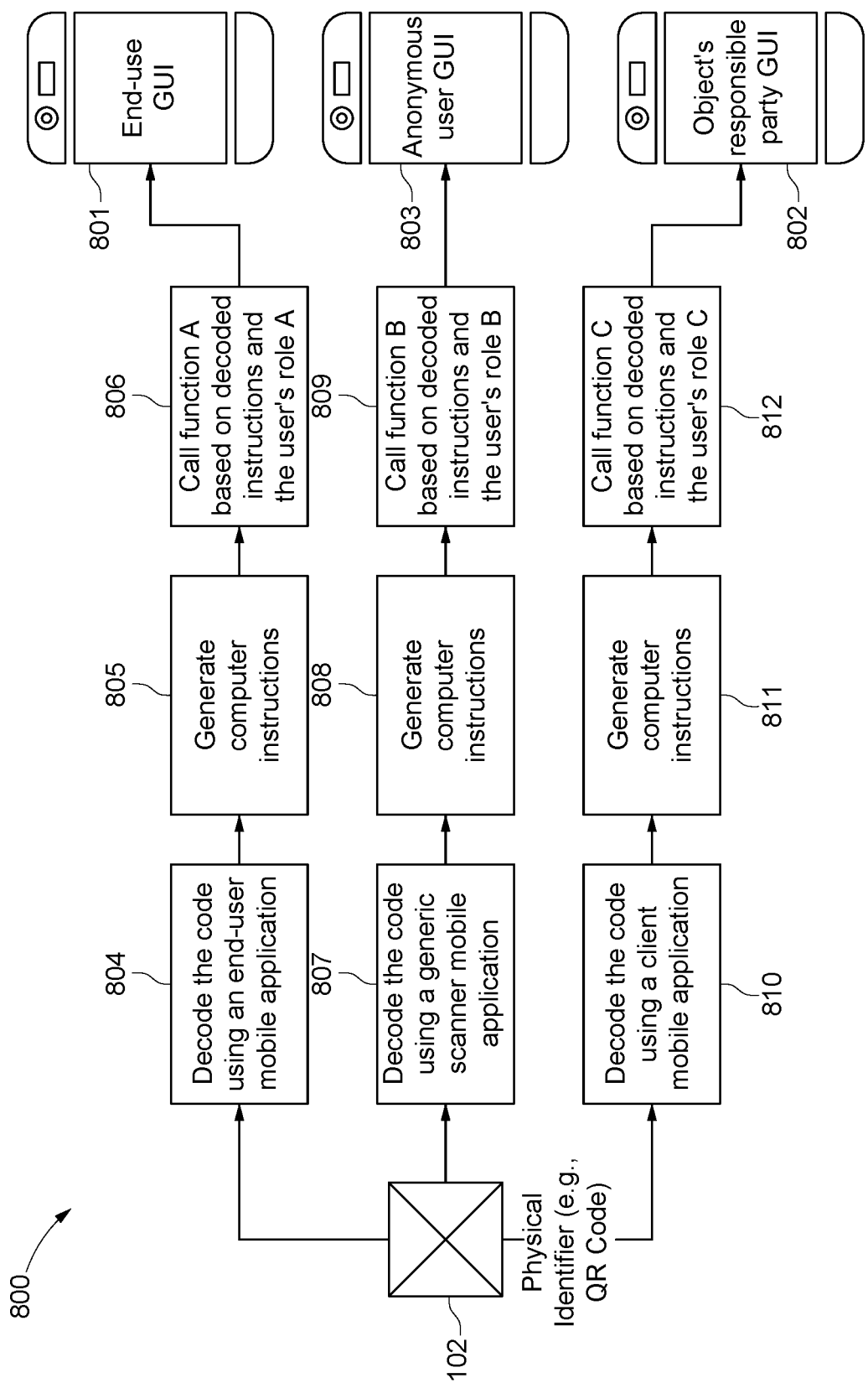
FIG. 8 is a block diagram illustrating different user interfaces according to the roles of users using an optical code as an example embodiment.

Referring to FIG. 8, a block diagram illustrates different user interfaces presented on the users' mobile applications according to users' roles using an optical code as an example embodiment. Shown are a physical identifier (e.g., QR code) 102, an end-user GUI 801 for a registered end-user who uses a mobile application installed on a user mobile device to scan a physical identifier, an object's responsible party GUI 802 for a registered client who uses a client's mobile application installed on a mobile device to scan the same physical identifier, and an anonymous user GUI 803 for an anonymous user who scans the same physical identifier using a generic code reader mobile application.

In one embodiment, a registered end-user uses the system to communicate with an object and its associated AI agent, and the AI agent can access the object KB and other data resources to obtain detailed information related to the identified object and the user. For example, the information may include the user's profile image, name, address, phone number, email, object's properties, common questions and answers for the object, user's interaction histories with the same object, and user's conversational histories with the AI agent.

When a registered user uses an end-user mobile application to scan a physical identifier 102, a conversational GUI may present to the user with a user's profile image, the object's image, the AI agent image, and AI agent's identification number, the greeting message, etc. The process steps include decoding step 804, generating computer instructions step 805, call function A based on the decoded instructions, and the user's role A 806.

In another embodiment, a user can be an anonymous user who does not have any registered account in the system. When a user uses a generic code reader application to access the system, user's role is defined as an anonymous user, and a generic conversational GUI is presented to the anonymous user. The generic conversational GUI for an anonymous user may include an object's name, an AI agent's identification, an icon of the AI agent, a greeting message, and a set of common questions related to the identified object, etc. The generic conversational GUI does not include any user-related information, or any other information should not be disclosed to an anonymous user. The process steps include a decoding step 807, a generating computer instructions step 808, a calling function B based on the decoded instructions and the user's role B 809.

In another embodiment, an object's responsible party logs in the client application to scan the same code, and the GUI may present a set of useful features for the object's responsible party to interact with the AI agent. Further, the object's responsible party can use the mobile client application to perform some tasks such as editing the identified AI agent, updating the identified object information in the object KB, communicating with the AI agent for updating work status related to this object, reviewing the AI agent's activity history, and so on. The process steps include a decoding step 810, a generating computer instructions step 811, a calling function (C) based on the decoded instructions, and the user's role (C) 812.

Referring to FIG. 9A-9D are screenshots illustrating a conversational GUI of an end-user mobile application running on a mobile user device according to certain embodiments of the invention. For example, GUIs shown in FIG. 9A-9D depicts a user using a registered end-user mobile application to scan a uniquely identified health center check-in board at the health center. The conversational GUI includes greeting messages, AI agent's icons, location information, timestamps, options buttons, a user input field with a function to upload files, user's responses, AI agent's responses, and user's profile images.

In one embodiment, when an end-user mobile application is launched on the mobile device, the mobile application connects to the system over a network. The system authenticates the user and presents the home screen to the user. When the user sees a physical identifier on a check-in board at the health center, they can use the scanner feature on the end-user mobile application to scan the physical identifier. The system identifies the registered user, the check-in board, then connects the user to an AI agent associated with the check-in board as soon as the physical identifier is scanned.

In this example, a conversational GUI includes graphical elements such as buttons, icons, texts, images, an input field, a file upload button, and messages. A user interacts with the GUI by selecting any button, tapping any image, typing characters in the user input field. The data is transmitted through APIs to the system on the remote server over a network. An AI agent retrieves information related to the identified object and the registered user, then presents the relevant information as the AI agent's response on the GUI to the user.

Figure 9A:
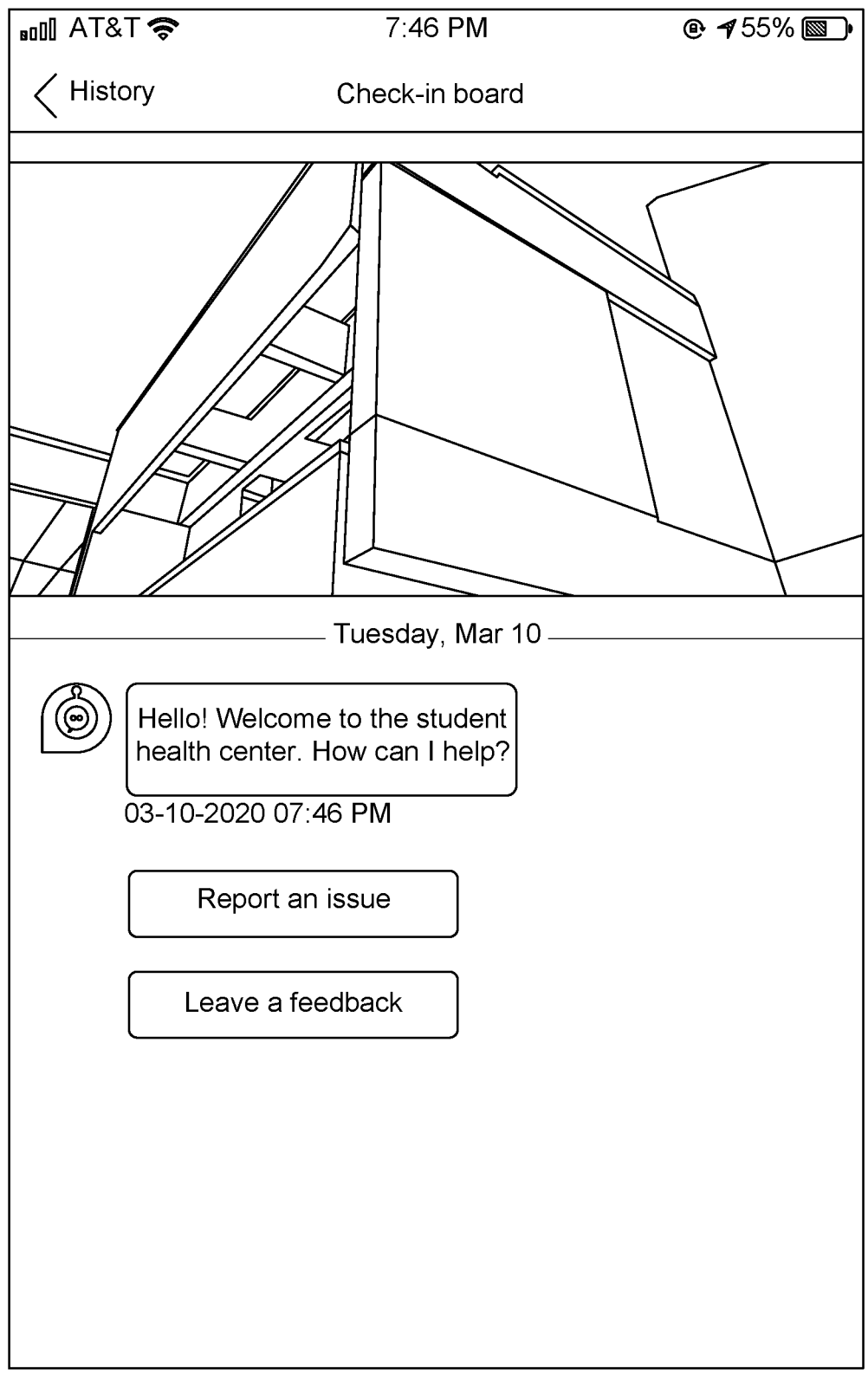
FIG. 9A-9D are screenshots illustrating a conversational graphical user interface of an end-user mobile application of a mobile user device according to certain embodiments of the invention.

Referring to FIG. 9A, a conversational GUI includes name of the identified object, the day of the week, date, timestamps, an object image, an icon representing an AI agent, a greeting message, and options buttons.

The options (e.g., "Report an issue," "Leave feedback) may be one or more commonly asked questions for the identified object in the object KB. The common questions can be updated by the AI agent after interacting with various users who interact with the same object. For example, the object KB contains questions that have been asked many times related to the object. The frequently asked questions are considered "common questions" and stored in the seed knowledge database. The common questions along with the appropriate answers to these questions related to an object can be shared by the object's responsible party. Their knowledge (or called expert knowledge) is another type of seed knowledge stored in the object KB. The object KB is updated by AI agents when a user provides a new question that has never been stored in the object KB. AI agents can evaluate the user's input and determine if it is new knowledge using an NLP engine, an ML engine, and analysis modules. Statistical modeling and text analysis algorithms may be applied to evaluate user's input.

Figure 9B:
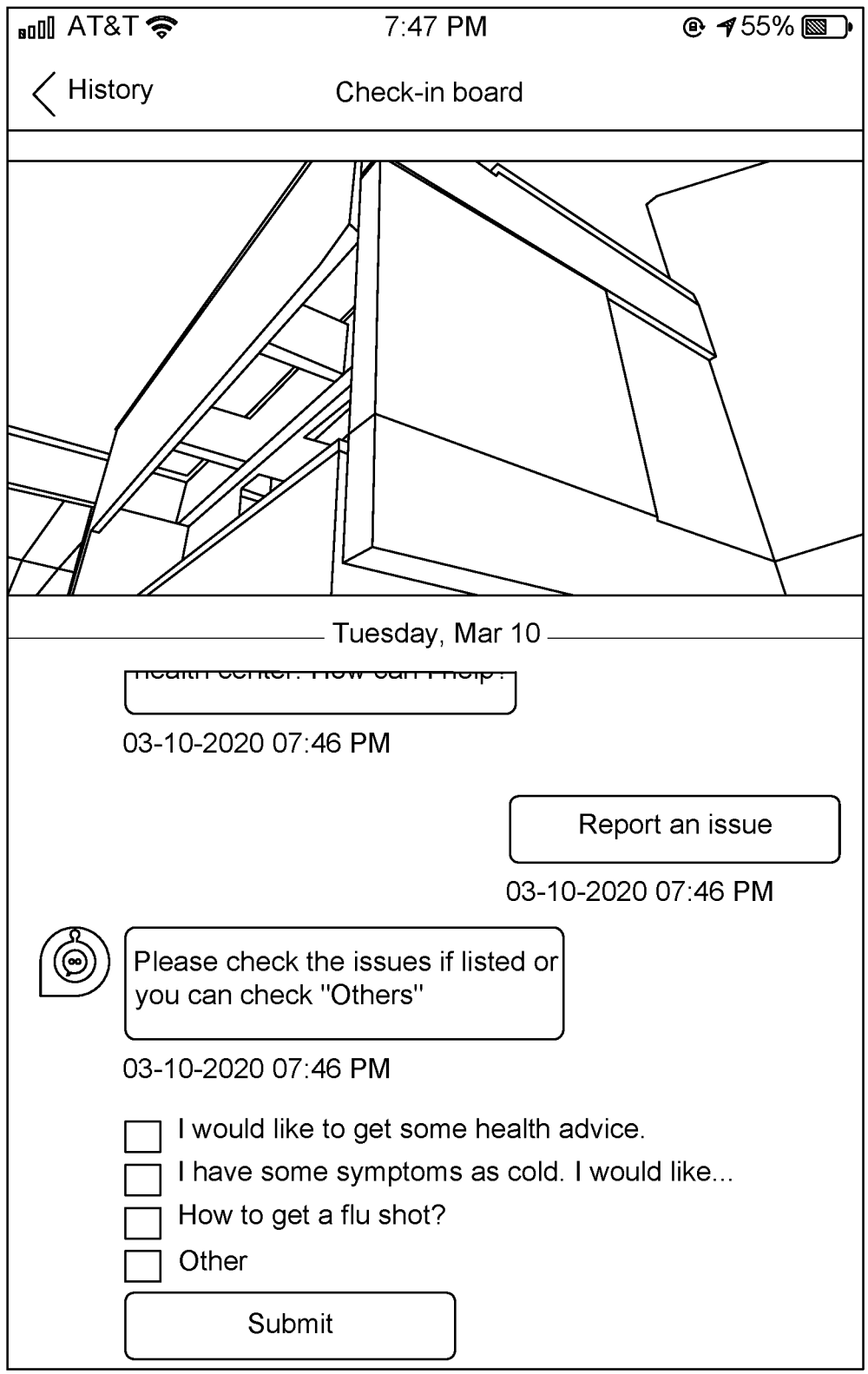
Figure 9C:
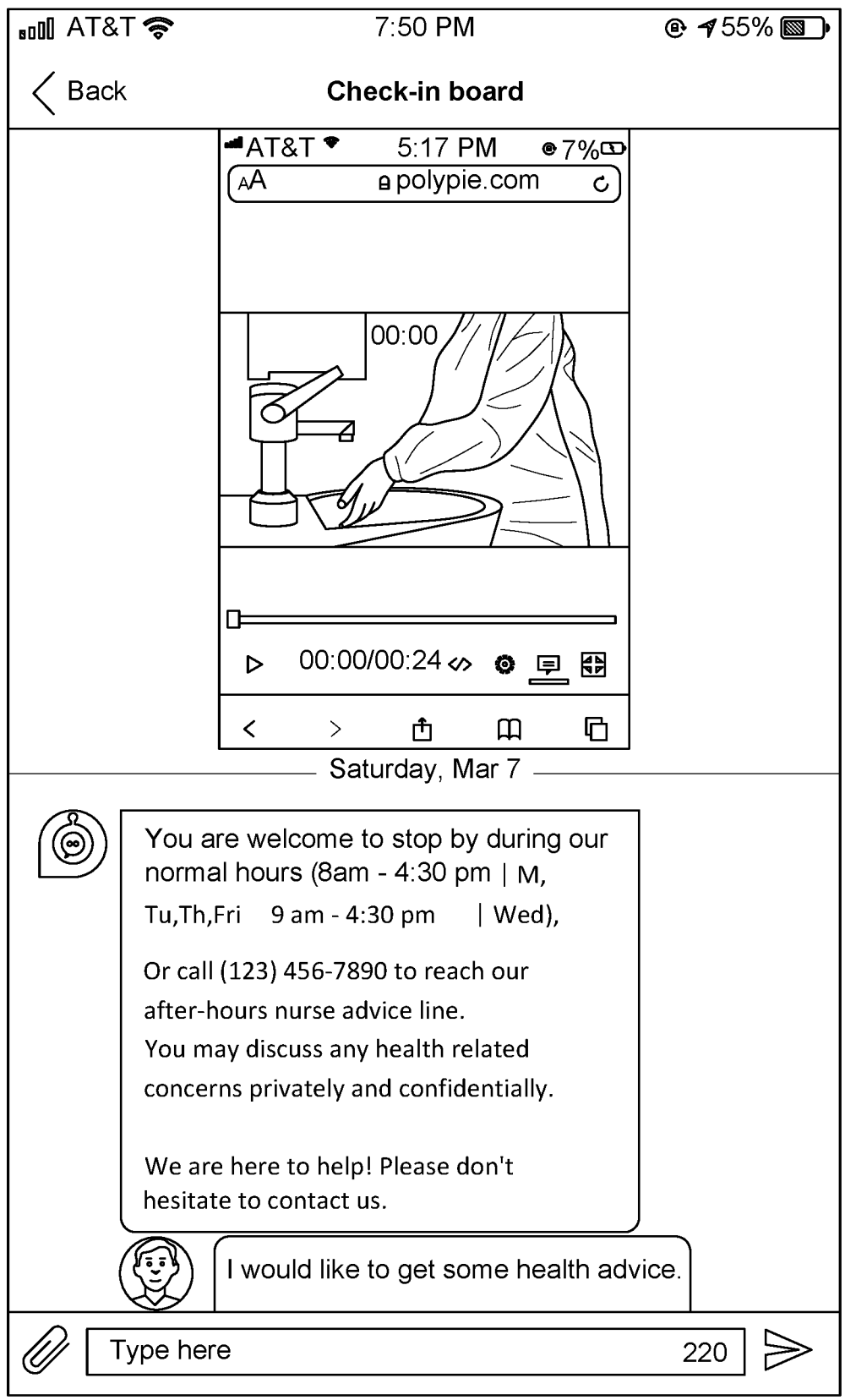
Figure 9D:
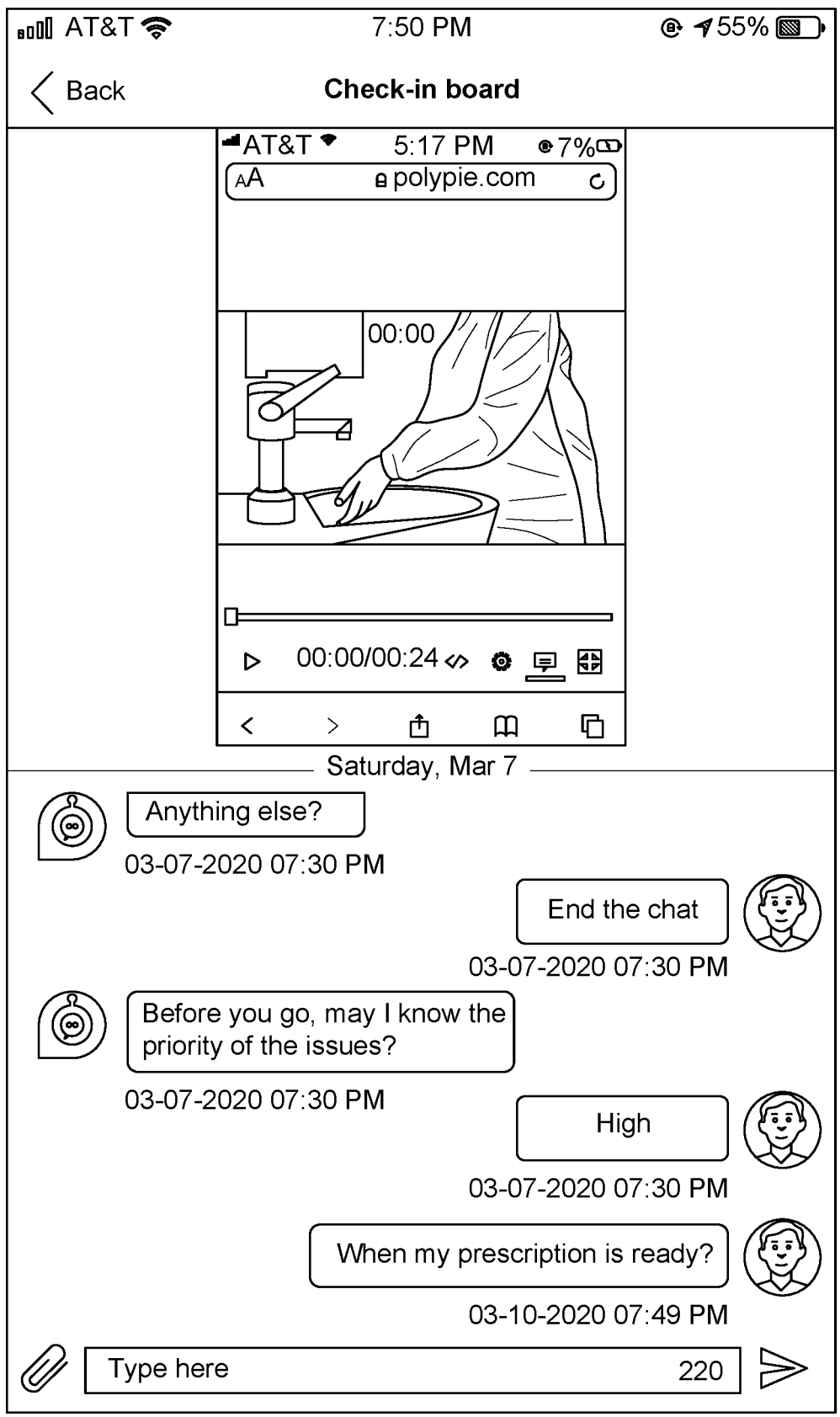
Figure 10A:
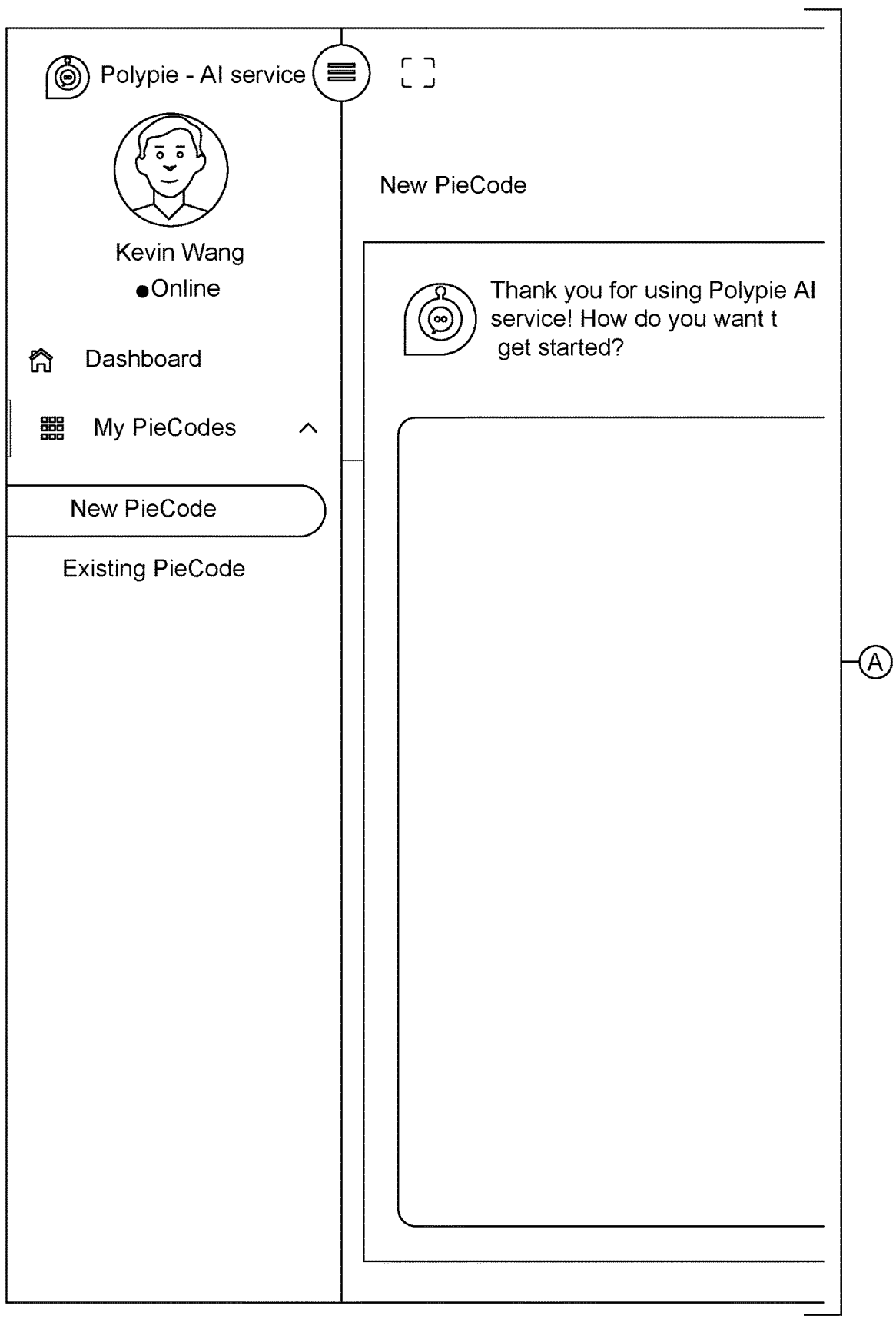
FIG. 10A-10F are screenshots illustrating an example of creating a new AI agent through a client web application.
Figure 10A:
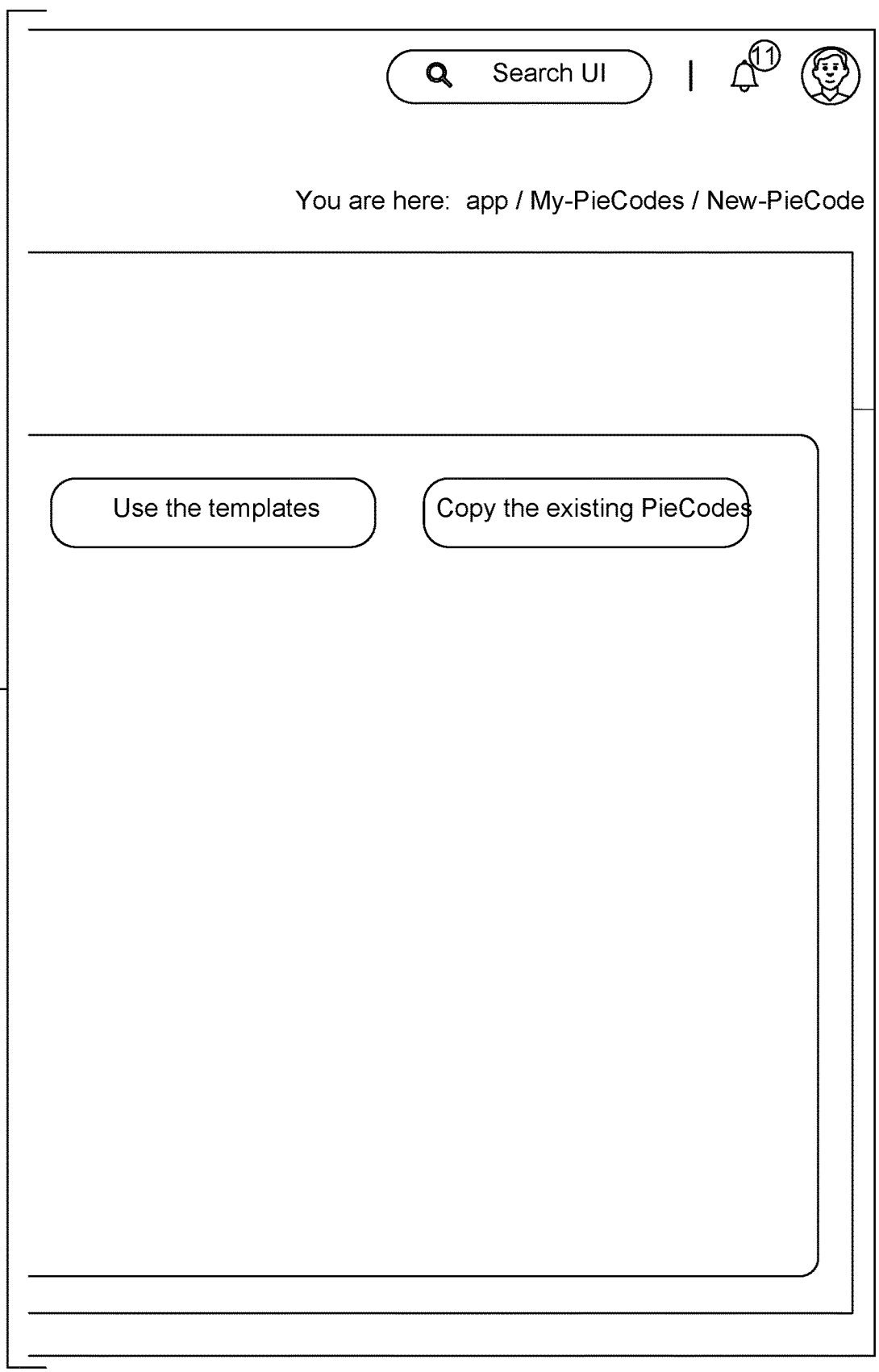
Figure 10B:
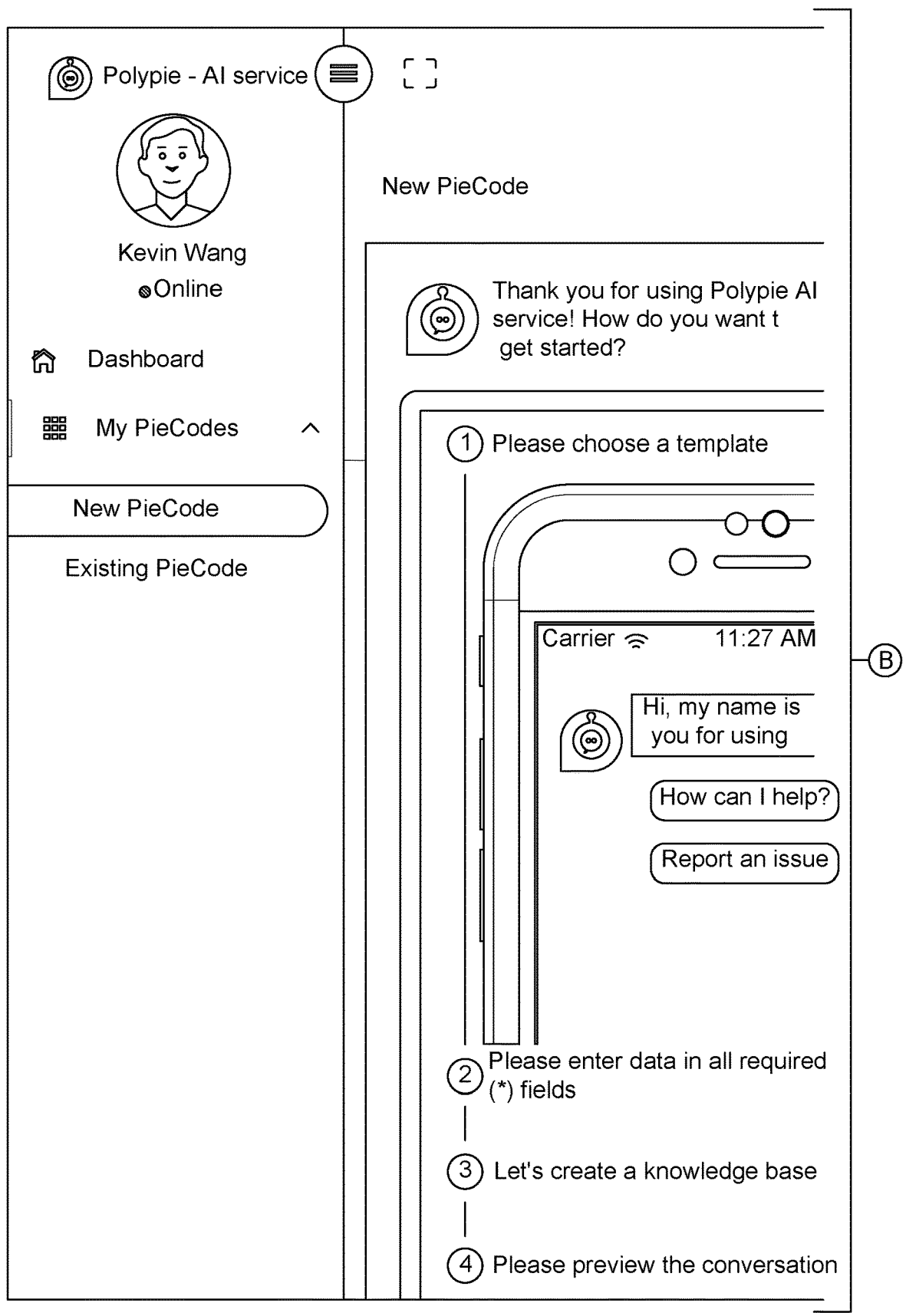
Figure 10B:
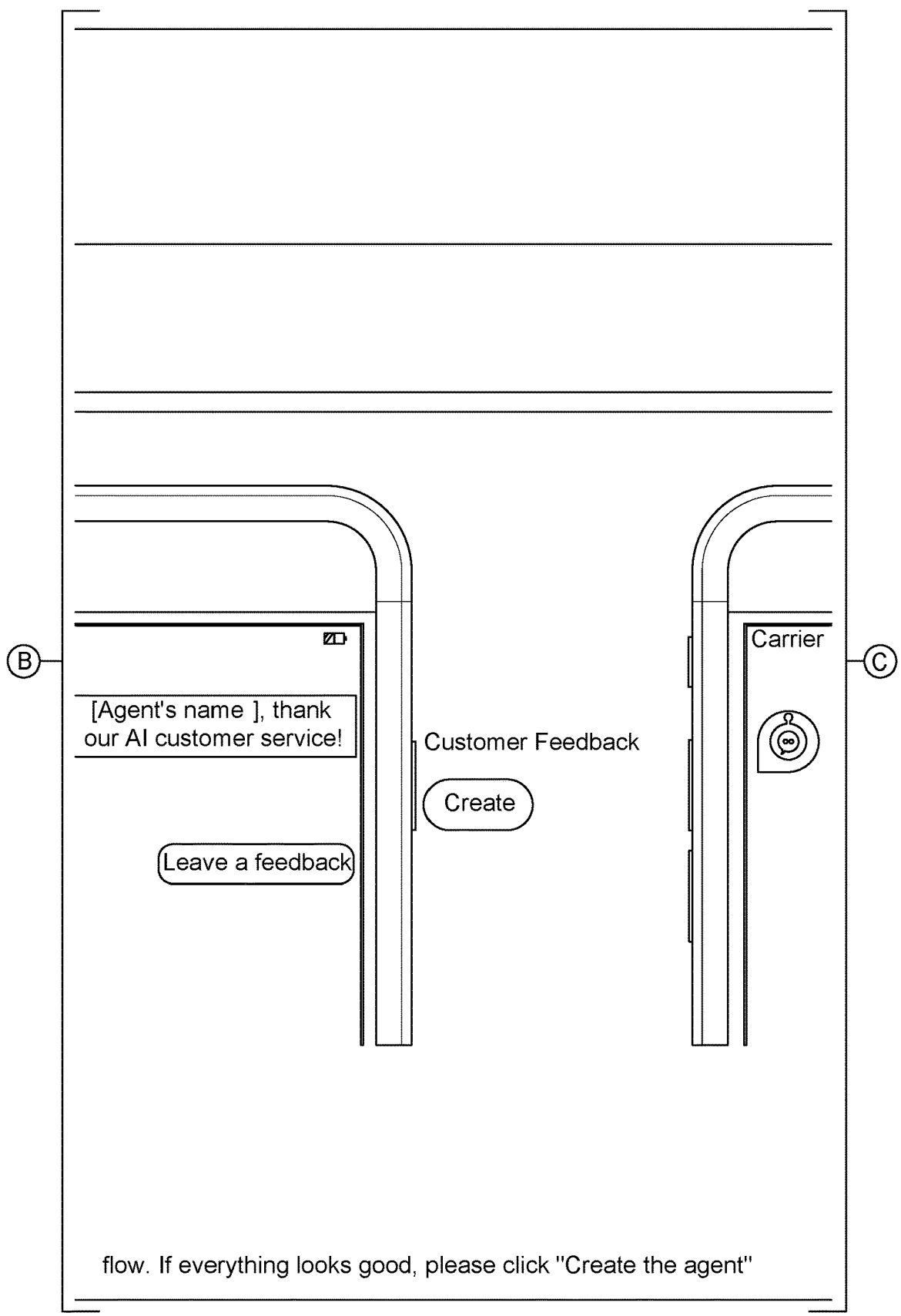
Figure 10B:
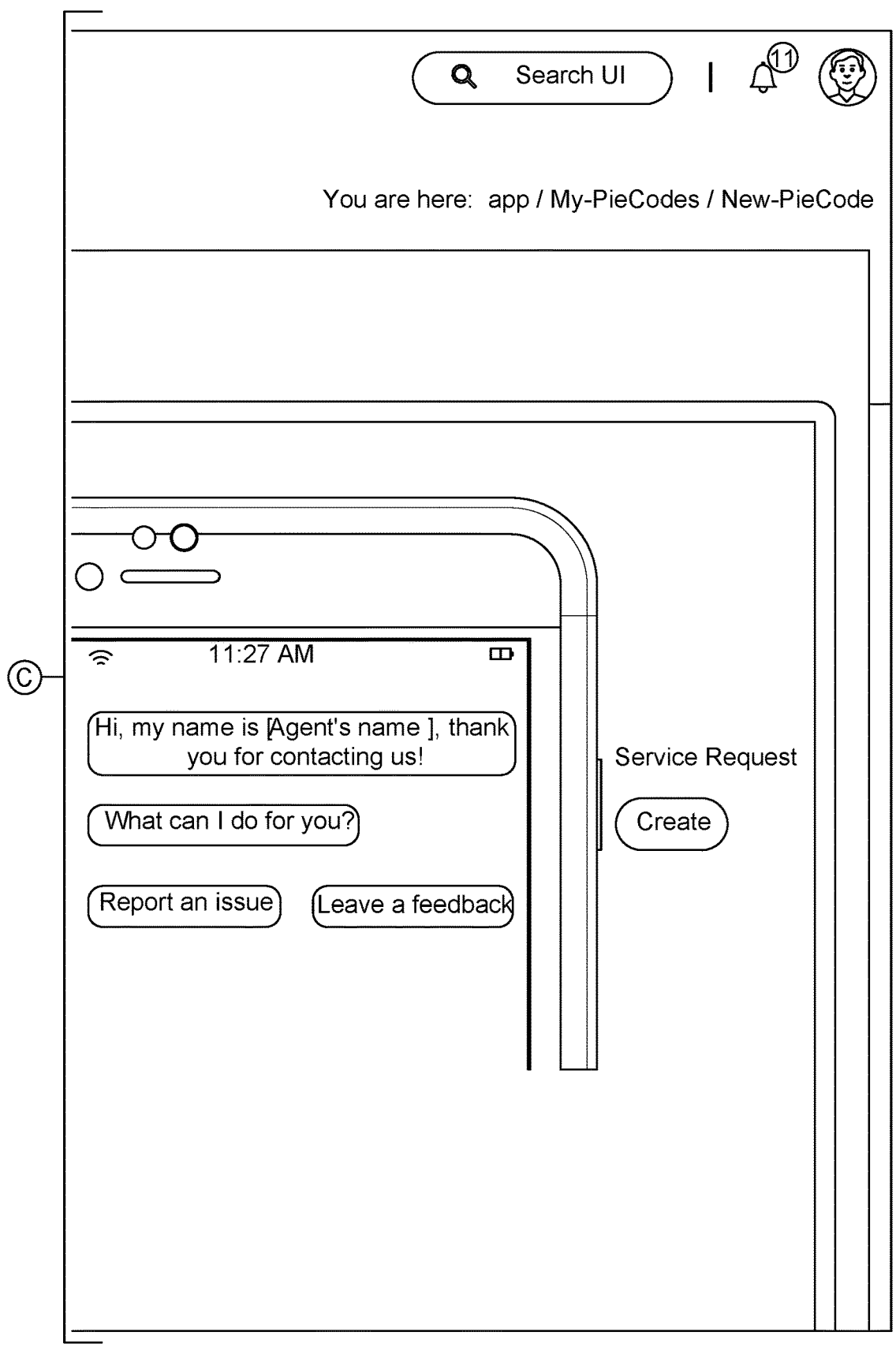
Figure 10C:
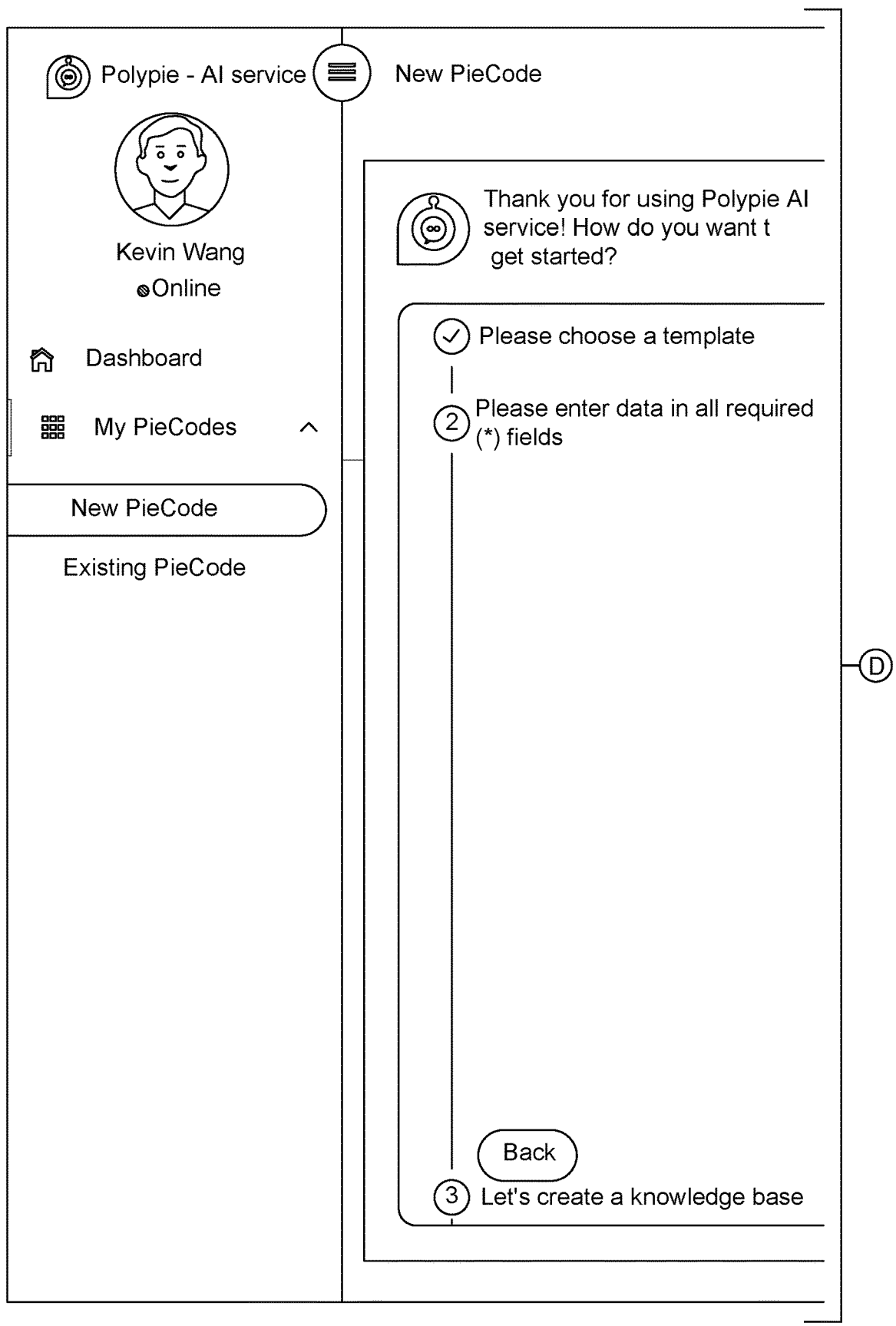
Figure 10D:
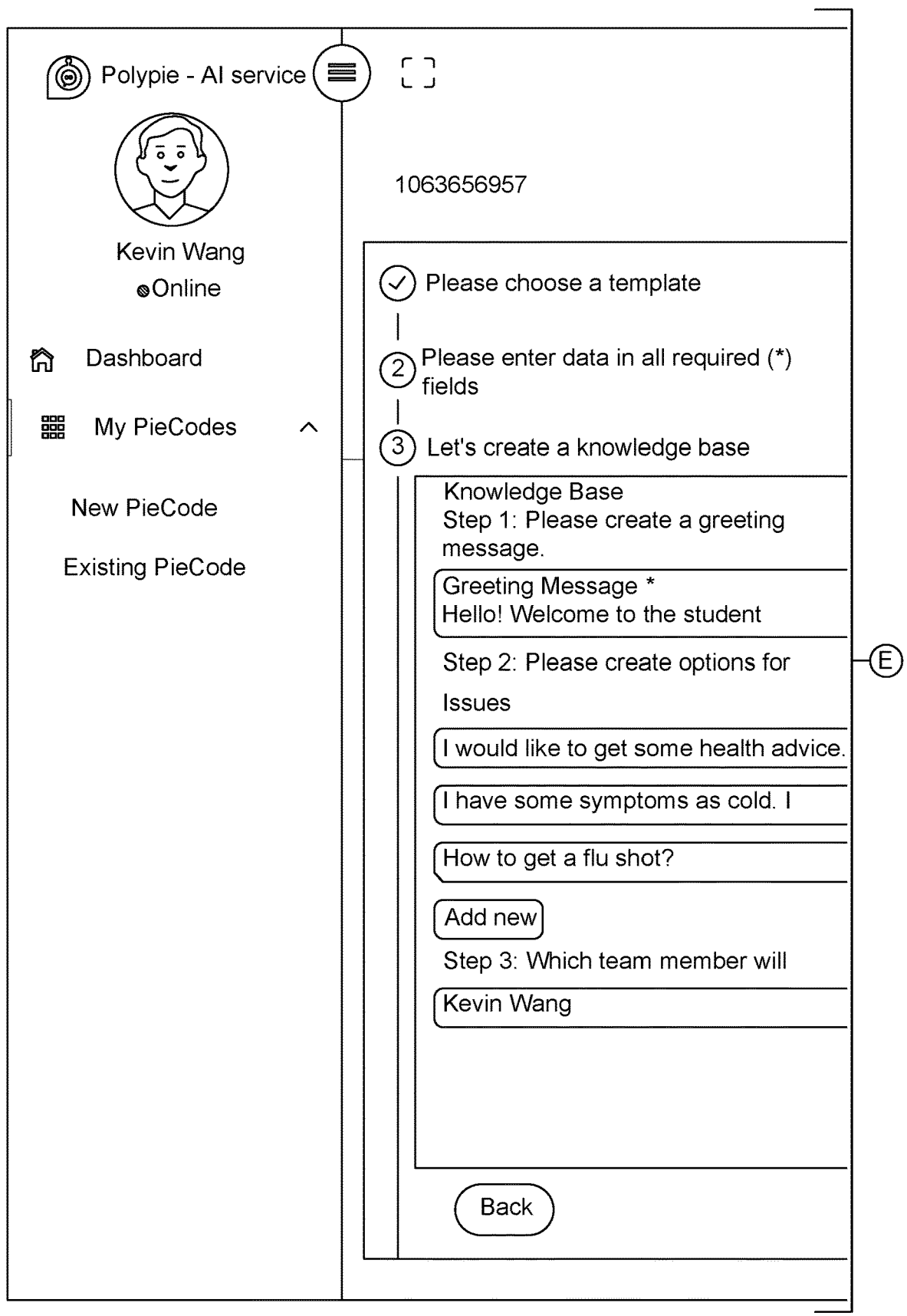
Figure 10D:
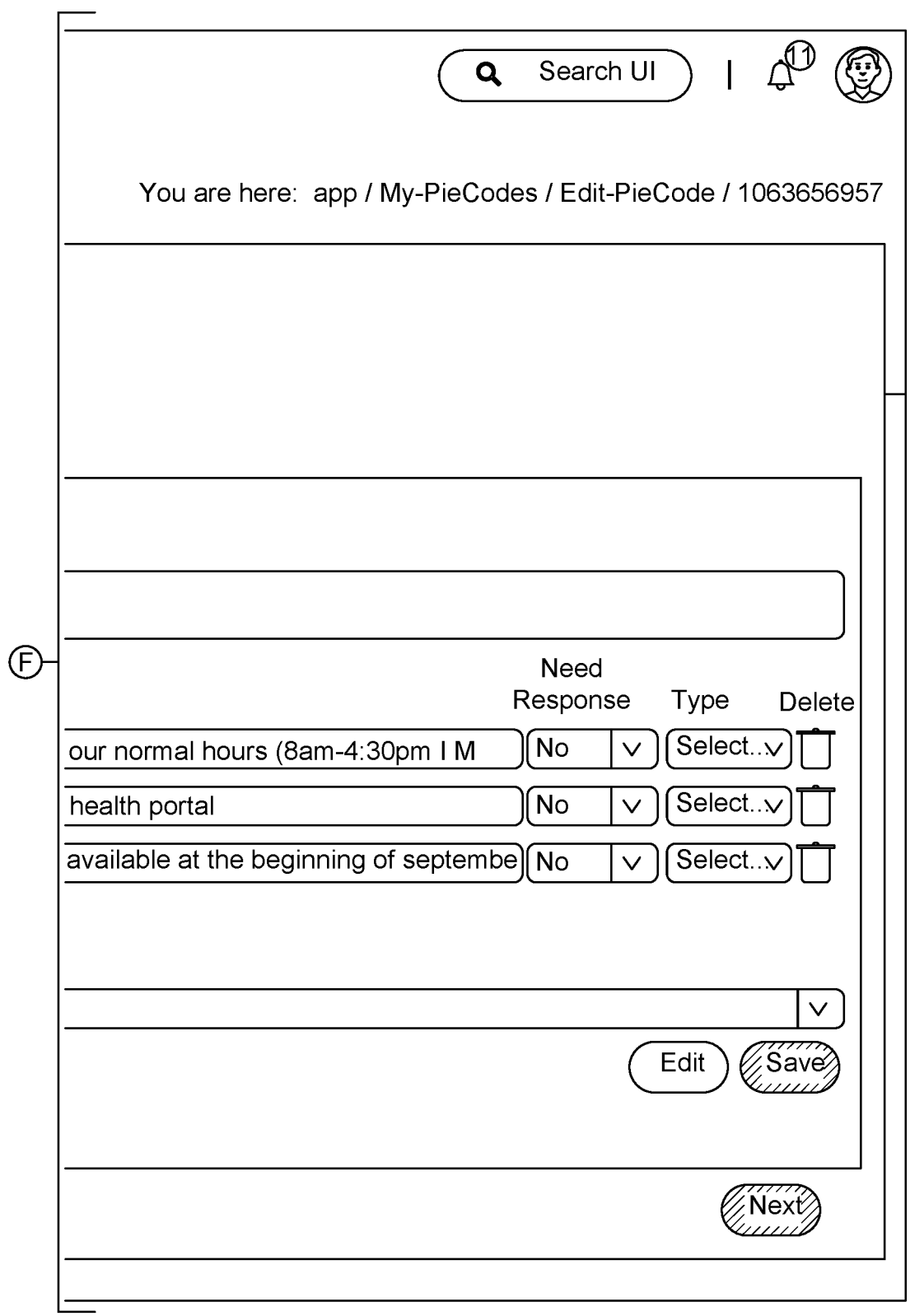
Figure 10E:
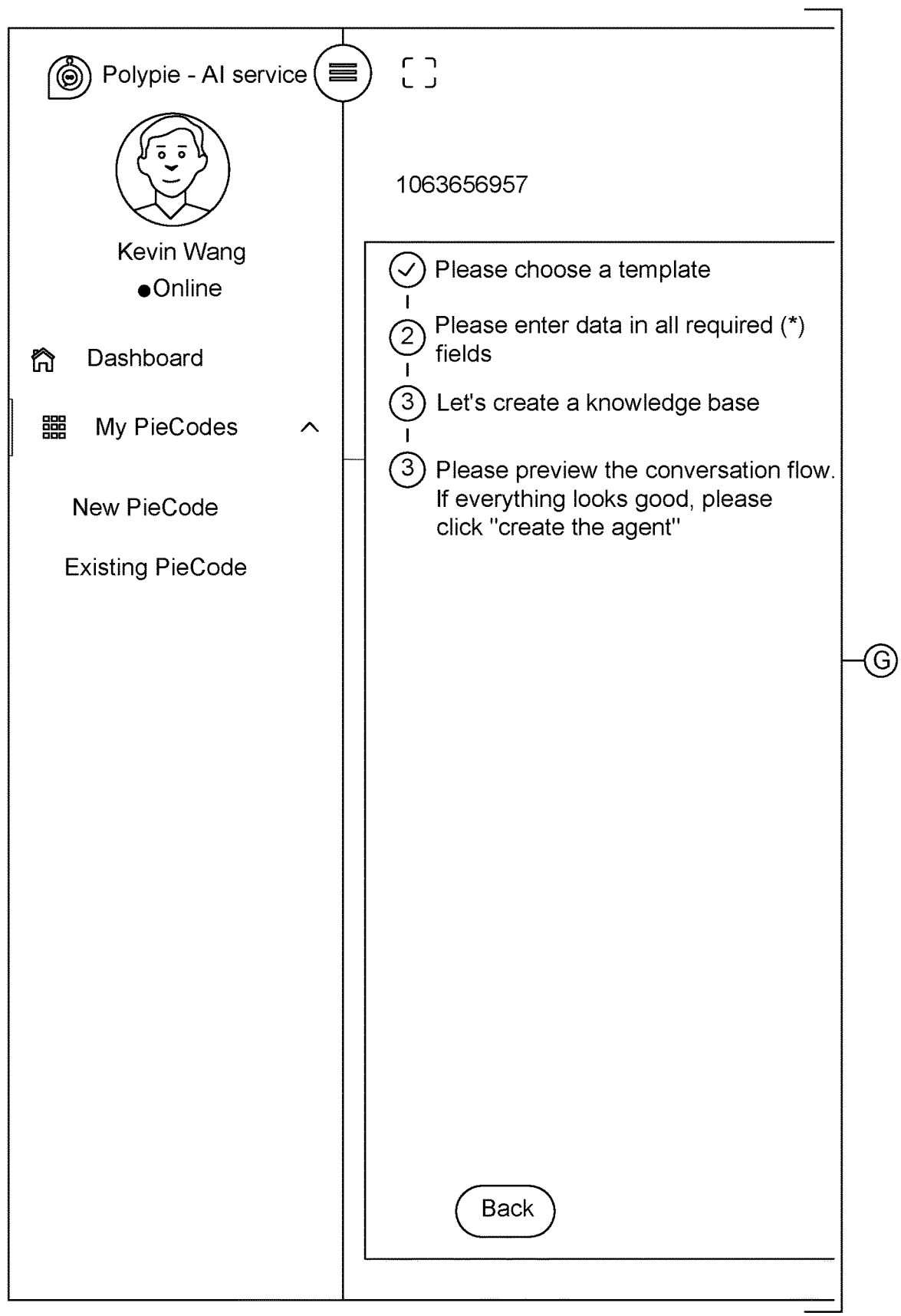
Figure 10E:
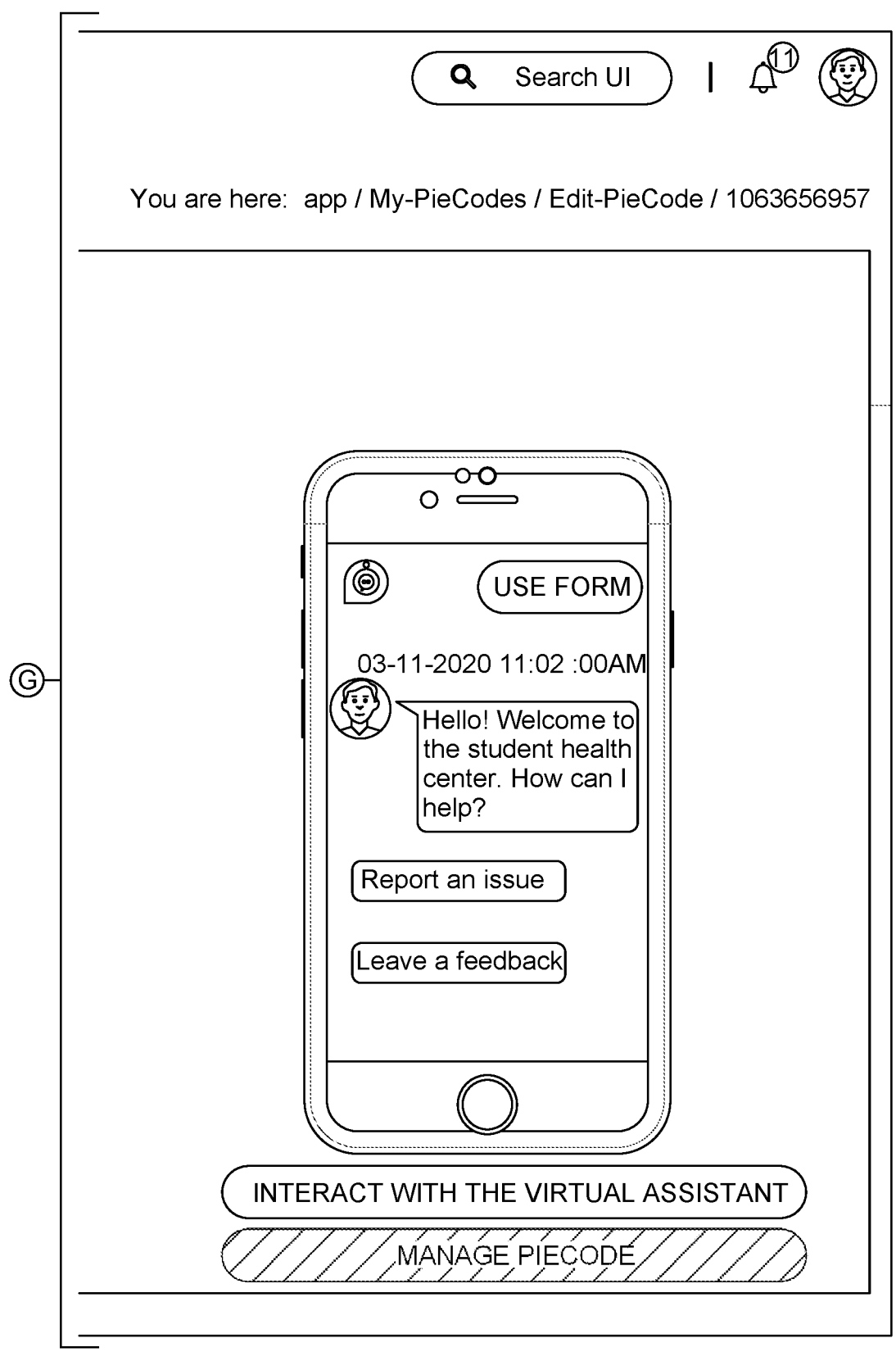
Figure 10F:
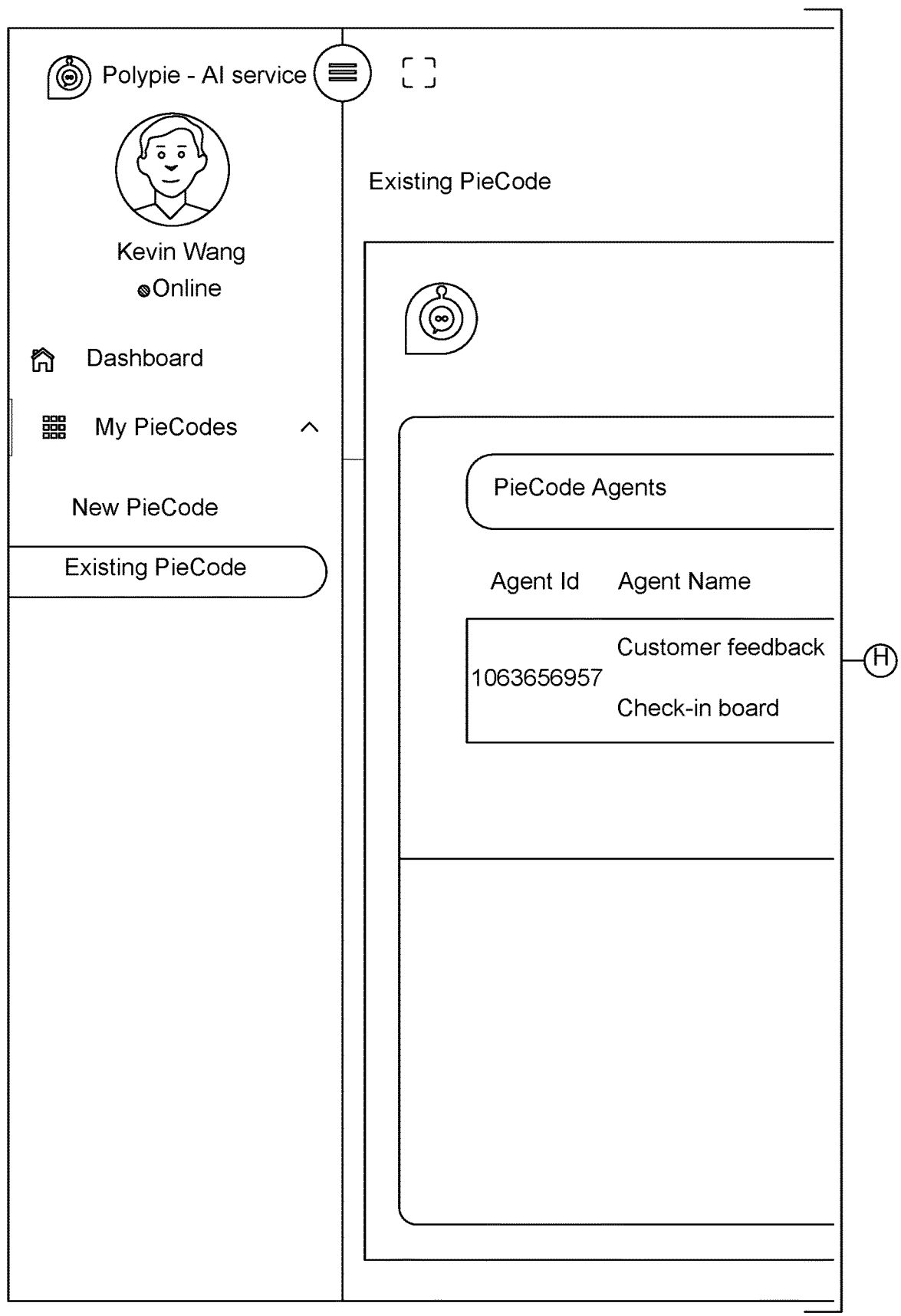
Figure 10F:
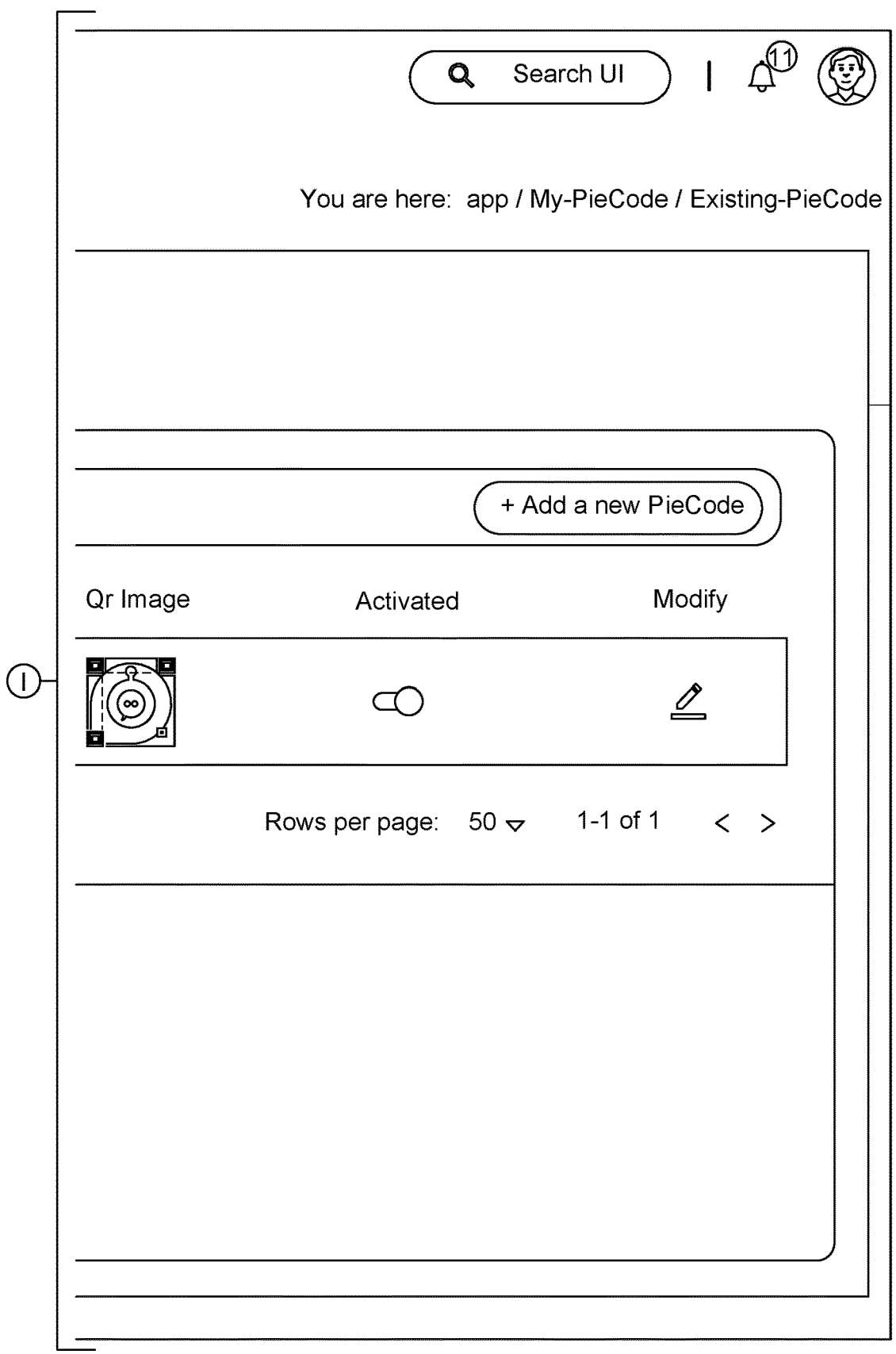

Referring to FIG. 9B-9D, a set of conversational GUIs include the name of the identified object, timestamps of AI agent's responses, timestamps of user's response, AI agent's responses, user's responses, a video related to the object, an icon representing the AI agent, user's profile images, a user input box, a file upload icon, a follow-up message from the user, and a timestamp for the follow-up message.

When a user selects an option provided by the AI agent, the AI agent automatically responds to the user with relevant information. The relevant information may be a predefined answer to the user's specific question. Besides retrieving the predefined answers from the object KB, the AI agent can also use an NLP engine and an ML engine in the system to generate new responses in the form of sentences or phrases which has not been used in the prior conversations to respond to the user's query. The new sentences or phrases can be generated by AI agents dynamically throughout the conversations. According to one embodiment, an AI agent analyzes a question submitted by a user. There are several factors such as the users' input, the identified objects, the communication initiation time, and location, etc. are considered in the scenario analysis. The results from the scenario analysis may be used to determine if the contents provided by the user are in the context of the conversations. The AI agent can use an ML engine in conjunction with the scenario analysis to predict the user's intents and provide relevant responses. In order to measure the AI agent's response, a response scoring algorithm is applied to evaluate the new response using users' input. As a result, AI agents will improve their knowledge to understand the user's query over time and provide a high-quality response in each interaction.

AI agents may ask users to specify the priority for the selected issues and prompt the users to leave feedback for the objects. If a user decides to end the chat, a notification with a chat history will be sent to the object's responsible party. The AI agent determines if reported issues need further human agent's actions. The user can provide follow-up messages to the AI agent after the conversation is ended. The user's follow-up messages and timestamps of the follow-up messages are displayed on the same conversational GUI on the mobile application. The AI agent can respond to the user's follow-up messages instantly or send a notification to the object's responsible party to further assist the user.

In one embodiment, when a user is connected to an AI agent, a conversational user interface on the mobile application is presented to the user on the mobile device. The dialog initiative can be shifted between a user and an AI agent along with some universal commands such as starting over, getting help, or ending the conversation. The conversation can be terminated anytime by the user using the universal commands such as "End the chat." Similarly, the user can start over the conversation in the middle of the conversation by entering a text command or tapping a "Starting over" button on the interface.

In another embodiment, a user can initiate a conversation using a voice command, an agent can respond to the user with voice or text presentations. The AI agents use voice recognition engine, an NLP engine, analysis modules to analyze user's input. In addition, the user can type or select a predefined query from a menu to interact with the AI agent. The menu is provided by the AI agent as soon as the user is connected to the AI agent. The AI agent determines the menu options based on user's role and scenario analysis. The menu can be updated dynamically within a dialog section by AI agents. The updates are part of the interaction histories stored in the object KB. AI agents can discern the intent of what a user is saying, synthesize the optimal responses using an NLP engine, an ML engine, object KB, analysis modules, and dynamically responds to the user through a conversational UI. The AI agent acquires knowledge from interacting with the users and updates the seed knowledge shared by the object's responsible party dynamically within a conversation. In one embodiment, a user wants to communicate with an object. An AI agent is connected for communication as soon as the user interacts the object using a mobile application. When a user sends a request, the AI agent uses an NLP engine, an ML engine, analytic modules, and object KB to process, analyze, and respond to the user's query. The process is completely automatic. In this embodiment, a unique AI agent is created for each unique identifiable object.

Referring to FIG. 10A-10F is an example of creating a new AI agent through a client web application. Shown are web pages on a client's web application to create an AI agent with two options: "Using a template" and "Copying from an existing AI agent". And the existing AI agent table is on another web page to show the new AI agent was created.

In one embodiment, the object's responsible party can use a template to create a new AI agent. The template is a set of forms with common features and functions for the object's responsible parties to create one kind of AI agents to serve users with the same purpose. In one embodiment, a retail business owner can use a template to create a customer service AI agent. The AI agent is deployed to the customer service desk using a machine-readable medium attached to the desk. The object KB is configured with a set of questions and answers as seed knowledge that will most likely be used in the retail settings. The same template to create a retail customer service AI agent can be used by other retailers. A few modifications to the templates will be necessary to tailor the individual business's needs.

In other embodiments, a new AI agent can be created by copying an AI agent from the existing AI agents list. An object's responsible party may want to deploy AI agents to a few objects with the same purpose. The object's responsible party can use the "Copy from the existing AI agent" feature on the application to duplicate the data from the existing AI agent to a new one. The duplication process will save substantial time for the object's responsible party. Since each object is uniquely identifiable, so does the AI agent. The system will generate different identification number for different AI agents. The object's properties can be modified to reflect the variation.

In another embodiment, an object's responsible party may create a new AI agent from the scratch. The object's responsible party can create a new AI agent using key components and features provided by the AI system. The AI agent can be customized with a new personality or new knowledge or new set of capabilities.

Figure 11:
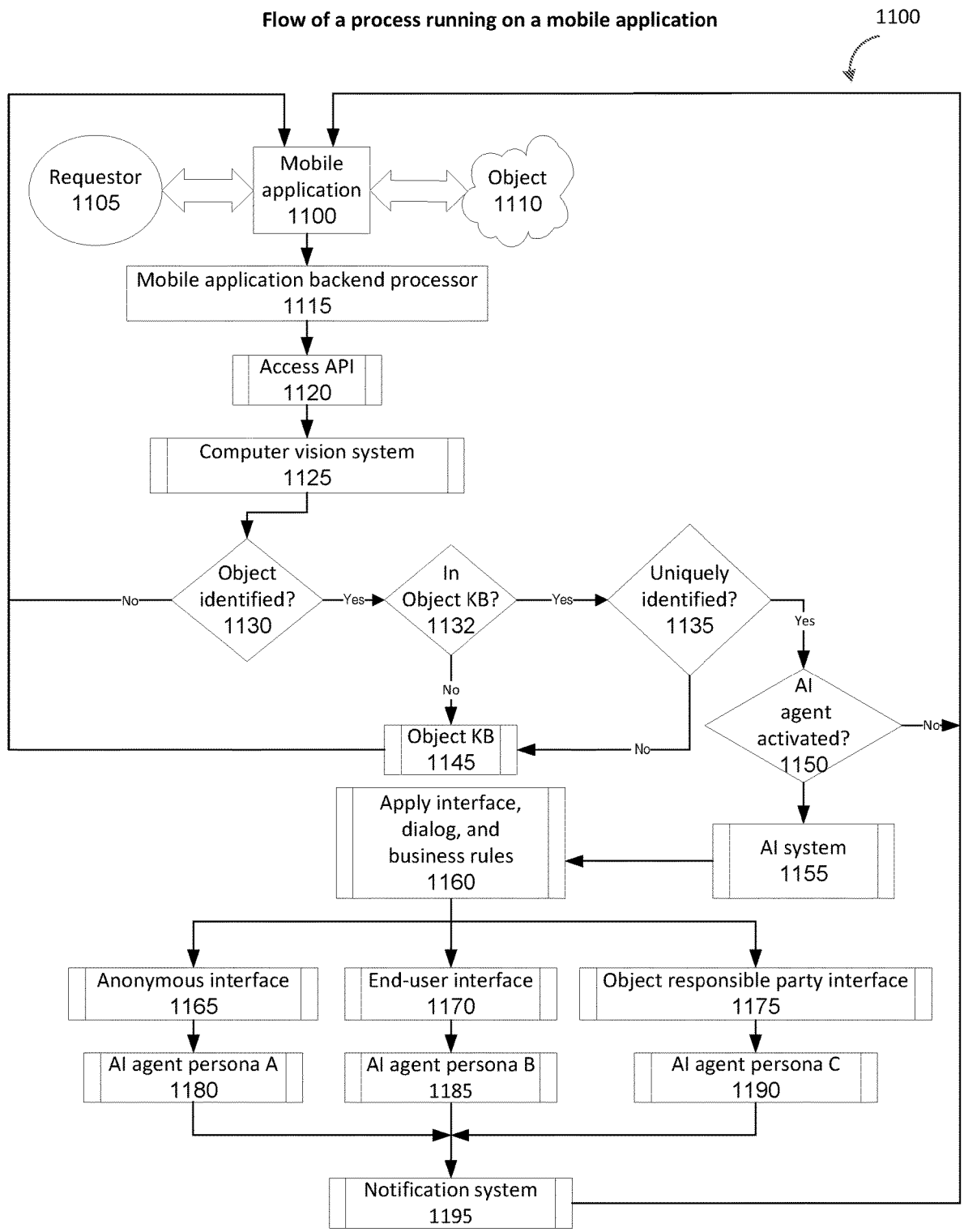
FIG. 11 shows the steps taken by an embodiment of the invention taken by a process initiated by a mobile application.

FIG. 11 shows the steps taken by an embodiment of the invention describing a process initiated by a mobile application 1100. In an example embodiment, a requestor 1105 asks a question about an object 1110 utilizing the mobile application 1100 which passes control to the mobile application backend processor 1115. The question could be, for example, about a broken sink at a gym. The requestor takes a picture of the broken sink. The backend processor 1115, may use a public API, such as, used by search engines and make a request or access API at step 1120. The API may categorize the picture as containing a sink. The process proceeds to step 1125 by accessing a computer vision system. The process determines whether the object is identified (decision 1130). This may be accomplished by applying an object recognition algorithm to the information to categorize the object. The categorized object may then be further analyzed to determine a unique identification for the object. If the object is identified, the process takes the 'Yes' branch. If the object is not identified, the process takes the 'No' branch which returns control to the mobile application

1100. The next process determines if the object is in the Object KB (decision 1132). If the object is in the Object KB, the process takes the 'Yes' branch. If the object is not in the Object KB, the process takes the 'No' branch. At step 1145 the object is added to the Object KB and the process returns control to the mobile application 1100. The process determines whether the object is uniquely identified (decision 1135). If the object is not uniquely identified, the process takes the 'No' branch, which proceeds to add the object to the Object KB at step 1145. This may be accomplished by requesting and receiving iteratively additional information about the object to determine a uniqueness qualification assessment. The uniqueness qualification assessment is one of uniquely identifiable and not uniquely identifiable. If the object is uniquely identified, then decision 1135 branches to the 'Yes' branch. When the uniqueness qualification assessment is uniquely identifiable, the uniqueness qualification assessment is mapped to a unique reference for the object in the object knowledge base. The process determines whether an AI agent associated with the uniquely identified object is activated (decision 1150). If the AI agent is activated, then decision 1150 branches to the 'Yes' branch. If the AI agent is not activated, then decision 1150 branches to the 'No' branch which loops back to 1100. This looping continues until the AI agent is activated, at which point decision 1150 branches to the 'Yes' branch exiting the loop. At step 1155, the process enables the AI system to use the rules that enables the AI agent to interact with the user. This is accomplished by adding the AI configuration selections associated with the uniquely identified object in the object knowledge base. At step 1160, the AI agent applies the interface, dialog, and business rules (refer to FIG. 8 and corresponding text). At step 1165, the AI agent utilizes the anonymous interface. At step 1170, the AI agent utilizes the ends user interface. At step 1175, the AI agent utilizes the object responsible party interface. At step 1180, the AI agent utilizes AI agent persona A. At step 1185, the AI agent utilizes AI agent persona B. At step 1190, the AI agent utilizes AI agent persona C. At step 1195, the AI agent utilizes the notification system.

It is to be understood throughout this document that the following terms shall be interpreted as indicated below:

Server: is not limited to one server and is not limited to one physical location.

Physical identifier: is not limited to a single machine-readable medium (e.g. QR code, or NFC), for example, non-machine-readable mediums such as images of a product or logo may be used as a physical identifier in combination with a machine-readable medium, to improve the accuracy of object identification using the computer vision system.

Computer vision system: may be integrated with 3rd party object identification service APIs (e.g., the Google cloud vision API).

Physical object's responsible party is not limited to a real person.

Machine-readable medium: is not limited to a medium visible using human naked-eyes. The machine-readable medium can be printed or made in a form invisible using human naked eyes, but detectable using a special tool or device.

AI agent: executes pre-defined dialog rules and business rules to communicate with a user. However, the rules are not limited to a single rule set up by a single member in the object's responsible party, which can be an organization having several subject matter experts. The rules are not limited to static rules. The rules may be updated over time by the system.

Modifying an AI agent: is not limited to modifying non-physical components of a configuration. It may include any necessary system- or device-based modifications in addition to the software and data updates.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of enabling a contextually relevant communication with a physical object, comprising: detecting a first user's location in a physical environment by an AI (Artificial Intelligence) application running on the first user's mobile device; interactively collecting and analyzing information about a plurality of physical objects and the physical environment by the AI application to form a first set of contextual understanding of the plurality of physical objects and the physical environment; requesting a communication with an AI system by sending the first set of contextual understanding of the plurality of physical objects and the physical environment to identify a most relevant information through a communication network; responsive to receiving the communication request by the AI system to identify the most relevant information from the plurality of physical objects and the physical environment, the method further comprising: constructing explicit and relevant descriptions about the plurality of physical objects and searching iteratively for a seed knowledge corresponding to each physical object in the plurality of physical objects in an object knowledge base by the AI system; utilizing a scenario analysis and the object knowledge base to identify the most relevant information in the physical environment; analyzing the most relevant information in the physical environment to determine if the most relevant information is in the object knowledge base; responsive to determining the most relevant information is not in the object knowledge base, automatically adding the most relevant information to the object knowledge base by the AI system; analyzing the most relevant information in the object knowledge base to form a uniqueness qualification assessment by the AI system; responsive to determining the most relevant information is not uniquely identified by the AI system, gathering additional data related to the most relevant information iteratively until a most relevant physical object is uniquely identified; updating the object knowledge base with the uniqueness qualification assessment by the AI system; responsive to determining the most relevant physical object is uniquely identified, mapping the uniqueness qualification assessment to a unique reference for a conversational AI agent; determining whether the conversational AI agent is activated and online by the AI application; responsive to the determining the conversational AI agent is not activated and online, notifying the first user and automatically disconnecting from the communication network by the AI system; responsive to the determining the conversational AI agent is activated and online, enabling the contextually relevant communication related to the most relevant physical object to the first user with the conversational AI agent; generating dynamically a first set of characteristics and a first persona for the conversational AI agent by the AI system utilizing an AI agent builder toolkit, wherein the first persona for the conversational AI agent is determined based on a plurality of factors comprising the most relevant physical object, the first user, and the physical environment; dynamically generating a first set of conversational contents by the conversational AI agent through NLG (Natural Language Generating) and NLP (Natural Language Processing); sending the first set of conversational contents to the first user using information related to the most relevant physical object and the physical environment; generating dynamically a second set of conversational contents through NLP, NLU (Natural Language Understanding), and NLG by the conversational AI agent after receiving a response to the first set of conversational contents from the first user; and adding the first set of conversational contents and the second set of the conversational contents to the object knowledge base; responsive to interacting with the most relevant physical object to the first user by a second user, receiving a third set of conversational contents with a second activated and online conversational AI agent with a second persona wherein the first persona is different from the second persona; and utilizing the AI system by the second user to interact with the most relevant object to the first user by receiving the third set of conversational contents with the second activated and online conversational AI agent without receiving assistance from a human and wherein the first set of conversational contents is different from the third set of conversational contents.

2. The method of claim 1, wherein the AI application applies a computer vision and advanced object recognition algorithms with an aid of a machine learning engine to detect a unique identifier associated with the most relevant physical object in the physical environment.

3. The method of claim 2, wherein the unique identifier is a constructed identifier which is dynamically generated by the AI system through the computer vision and advanced object recognition algorithms with the aid of the machine learning engine.

4. The method of claim 3, further comprising: searching iteratively for the constructed identifier in the object knowledge base associated with the most relevant physical object in the physical environment; automatically forming the uniqueness qualification assessment of the most relevant physical object utilizing the constructed identifier; and updating automatically the seed knowledge for the most relevant physical object in the object knowledge base with the uniqueness qualification assessment by the AI system.

5. The method of claim 2, wherein the machine learning engine applies dynamically a machine learning algorithm selected from a group consisting of a supervised learning algorithm, a semi-supervised algorithm, and an unsupervised algorithm to model and predict a first user intent when the first user communicates with the most relevant physical object in the physical environment through the conversational AI agent.

6. The method of claim 1, wherein the scenario analysis is a series of steps of analysis for a plurality of factors of the contextually relevant communication comprising a set of environmental data, a plurality of characteristics of a plurality of physical objects in the physical environment, a communication date and time, a communication location, the first user's location, a type of application, and a status of the conversational AI agent.

7. The method of claim 1, wherein the first conversational AI agent receiving information from a non-AI application automatically keeps the first user information anonymous to protect a privacy of the first user and wherein the first activated and online conversational AI agent receiving information from the AI application does not keep the first user information anonymously.

8. The method of claim 7, wherein the most relevant physical object is a first broken faucet and wherein a first issue about the first broken faucet with a physical unique identifier in a public restroom is transmitted through the non-AI application, and wherein the non-AI application anonymously interacts with the first broken faucet with the first activated and online conversational AI agent.

9. The method of claim 8, further comprising: analyzing the received information to identify a recipient for a notification related to the first broken faucet; and determining automatically when to send the notification and what to be included in the notification by the AI system.

10. The method of claim 7, wherein a second user reports the first issue for the first broken faucet in the public restroom using the AI application with a second activated and online conversational AI agent and wherein the second user is identified as a registered user by the AI system receiving a second set of conversational contents generated by the second activated and online conversational AI agent and wherein the first set of conversational contents is different from the second set of conversational contents.

11. The method of claim 1, wherein the most relevant physical object is a first faucet in the first user's master bathroom and wherein the method further comprises: communicating the first faucet related information interactively with the first user through the first activated and online conversational AI agent using the AI application; and generating dynamically a first persona for the first activated and online conversational AI agent with by the AI system with a human quality to provide a first compelling interface to the first user and wherein the first compelling interface depicts the first persona representing a female of age twenty with a delightful voice.

12. The method of claim 1, wherein the most relevant physical object is a first faucet in a hospital's restroom and wherein the method further comprises: communicating the first faucet related information interactively with the first user through a second activated and online conversational AI agent using the AI application; and generating dynamically a second persona for the second activated and online conversational AI agent with by the AI system with a human quality to provide a second compelling interface to the first user and wherein the second compelling interface depicts the second persona representing a male of age forty with an empathetic tone in the contextually relevant communication.

13. The method of claim 1, wherein the uniqueness qualification assessment comprises a stationary attribute of the most relevant physical object, a GPS (Global Positioning System) location of the most relevant physical object, the first user's mobile device's GPS location, a set of environmental data, a timestamp when a communication is initiated, and a set of a first user's behavior data interacting with the AI application.

14. The method of claim 1, wherein the conversational AI agent utilizes an analysis module configured automatically by the AI system and the object knowledge base to support the conversational AI agent's learning and analytical capabilities on the contextually relevant communication.

15. The method claim 14, wherein the analysis module is coupled with a NLP engine and a machine learning engine to provide aspect analysis, sentiment analysis, text analysis, and scenario analysis for the conversational AI agent to verify, formulate, and validate the first user's query to determine an accurate response.

16. The method of claim 1, wherein the contextually relevant communication is processed based on the first user's actions and wherein the method further comprises: responsive to the first user ending a conversation with the conversational AI agent, disconnecting automatically with the conversational AI agent and ending the contextually relevant communication by the AI system.

17. The method of claim 1, further comprising: providing a user-interface to allow an update of the conversational AI agent wherein the user-interface supports inputs selecting a group consisting of an existing template and a copying information from an existing conversational AI agent.

18. The method of claim 1, wherein the AI system utilizes the AI agent builder toolkit and a plurality of functions to automatically customize and generate a plurality of human-like characteristics and personalities comprising personas, conversational interfaces, dialog rules related to the most relevant Physical object in the Physical environment for the conversational AI agents.

* * * * *